United States Patent
Yokouchi et al.

(10) Patent No.: US 9,180,923 B2
(45) Date of Patent: Nov. 10, 2015

(54) WINDSHIELD STRUCTURE FOR SADDLE-RIDE TYPE VEHICLE

(71) Applicant: HONDA MOTOR CO., LTD., Tokyo (JP)

(72) Inventors: Kohei Yokouchi, Wako (JP); Hiroyuki Sasazawa, Wako (JP); Tomotake Shimoji, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 232 days.

(21) Appl. No.: 13/901,708

(22) Filed: May 24, 2013

(65) Prior Publication Data

US 2013/0320697 A1 Dec. 5, 2013

(30) Foreign Application Priority Data

May 31, 2012 (JP) .................................. 2012-124353

(51) Int. Cl.
*B62J 17/06* (2006.01)
*B62K 19/46* (2006.01)

(52) U.S. Cl.
CPC ............... *B62J 17/065* (2013.01); *B62J 17/06* (2013.01); *B62K 19/46* (2013.01); *B62K 2202/00* (2013.01)

(58) Field of Classification Search
CPC ......... B62D 35/00; B62J 17/06; Y02T 10/82; Y02T 50/166
See application file for complete search history.

(56) References Cited

U.S. PATENT DOCUMENTS

| | | | | |
|---|---|---|---|---|
| 3,319,593 | A | * | 5/1967 | Papst .......................... 114/67 R |
| 4,010,812 | A | * | 3/1977 | Bothwell ....................... 180/227 |
| 4,457,552 | A | * | 7/1984 | Katsuoka ..................... 296/78.1 |
| 4,633,965 | A | * | 1/1987 | Tsurumi et al. ............... 180/229 |
| 5,109,942 | A | * | 5/1992 | Akimori et al. ............... 180/219 |
| 5,794,733 | A | * | 8/1998 | Stosel et al. ................ 180/68.1 |
| 8,474,895 | B2 | * | 7/2013 | Michisaka et al. ........... 296/37.1 |
| 8,505,668 | B2 | * | 8/2013 | Iwakami et al. .............. 180/220 |
| 2002/0007977 | A1 | * | 1/2002 | Ishii et al. ..................... 180/219 |
| 2003/0160425 | A1 | * | 8/2003 | Hyndman et al. ......... 280/304.3 |
| 2005/0083208 | A1 | * | 4/2005 | Konno et al. ............ 340/825.72 |
| 2005/0224266 | A1 | * | 10/2005 | Konno et al. ................ 180/68.1 |
| 2006/0066126 | A1 | * | 3/2006 | Ohzono ....................... 296/78.1 |
| 2007/0063491 | A1 | * | 3/2007 | Horiuchi et al. ........... 280/728.2 |
| 2007/0247280 | A1 | * | 10/2007 | Nakamura ................... 340/5.72 |
| 2008/0156557 | A1 | * | 7/2008 | Okamoto ...................... 180/219 |

(Continued)

FOREIGN PATENT DOCUMENTS

| | | | | |
|---|---|---|---|---|
| EP | 1958861 A1 | * | 8/2008 | ............. B62K 11/10 |
| EP | 2017168 A1 | * | 1/2009 | ............... B62J 17/02 |

(Continued)

*Primary Examiner* — Glenn Dayoan
*Assistant Examiner* — Paul Chenevert
(74) *Attorney, Agent, or Firm* — Birch, Stewart, Kolasch & Birch, LLP

(57) ABSTRACT

A windshield structure for a saddle-ride type vehicle to enhance a windshield effect by reducing a vacuum behind a leg shield and in the lateral center of the vehicle. The windshield structure for the saddle-ride type vehicle includes a front storage box that may be opened and closed that is provided in a surface of the leg shield on a side of a seat. A bottom covering portion is formed integrally with the leg shield and is formed to cover the front storage box from below. The bottom covering portion for covering the front storage box from below is formed with air discharge ports for releasing a flow of air from a front side of a vehicle body to a rear side of the leg shield.

17 Claims, 25 Drawing Sheets

(56) References Cited

U.S. PATENT DOCUMENTS

| | | | |
|---|---|---|---|
| 2008/0197647 A1* | 8/2008 | Sakamoto et al. | 296/24.3 |
| 2011/0155493 A1* | 6/2011 | Kogo et al. | 180/68.3 |
| 2013/0249238 A1* | 9/2013 | Yokouchi et al. | 296/180.1 |
| 2014/0062120 A1* | 3/2014 | Horiuchi et al. | 296/37.12 |

FOREIGN PATENT DOCUMENTS

| | | | | | |
|---|---|---|---|---|---|
| EP | 2428437 A1 | * | 3/2012 | | B62J 17/06 |
| FR | 1086746 A | * | 2/1955 | | B62J 17/06 |
| GB | 1604636 A | * | 12/1981 | | B62J 17/06 |
| JP | 10-203454 A | | 8/1998 | | |
| JP | 2006096171 A | * | 4/2006 | | B62J 9/00 |
| WO | WO 2006035920 A2 | * | 4/2006 | | B62J 17/02 |
| WO | WO 2009122800 A1 | * | 10/2009 | | B62J 17/06 |
| WO | WO 2010137033 A2 | * | 12/2010 | | B62J 17/06 |
| WO | WO 2011122254 A1 | * | 10/2011 | | B62J 17/06 |
| WO | WO 2013094294 A1 | * | 6/2013 | | B62J 23/00 |
| WO | WO 2013094295 A1 | * | 6/2013 | | B62J 17/06 |
| WO | WO 2014184849 A1 | * | 11/2014 | | B62J 27/00 |

* cited by examiner

WINDSHIELD STRUCTURE FOR SADDLE-RIDE TYPE VEHICLE

CROSS-REFERENCE TO RELATED APPLICATIONS

The present application claims priority under 35 USC 119 to Japanese Patent Application No. 2012-124353 filed May 31, 2012 the entire contents of which are hereby incorporated by reference.

BACKGROUND OF THE INVENTION

1. Field of the Invention

The present invention relates to a windshield structure for a saddle-ride type vehicle including a leg shield provided forward of a seat on which an occupant is seated.

2. Description of Background Art

A saddle-ride type vehicle such as a motorcycle is known that includes a leg shield for covering the front sides of the feet of an occupant. A flow of air from a front side of a vehicle body is taken into a duct from an air guide port opened in a front surface of a front cover and injected from the duct to a side end of the leg shield. See, for example, JP-A No. 10-203454. By thus injecting the flow of air to the side end of the leg shield, it is possible to suppress entrainment of the flow of air to a side of the occupant, suppress a vacuum state in a foot space, and enhance a windshield effect on the occupant.

However, in the conventional structure, since a plurality of ducts is provided at an end of the leg shield, air is not guided to a lateral center side of the vehicle. Thus, there is a possibility of causing an insufficient prevention of the entrainment of the flow of air behind the leg shield.

SUMMARY AND OBJECTS OF THE INVENTION

The present invention has been made in view of the above-described circumstances. It is an object of an embodiment of the present invention to provide a windshield structure for a saddle-ride type vehicle for enhancing a windshield effect by reducing the vacuum behind the leg shield and in the lateral center of the vehicle.

For addressing the above-mentioned problem, according to an embodiment of the present invention, there is provided a windshield structure for a saddle-ride type vehicle including a leg shield (601) provided forward of a seat (10) on which an occupant is seated with a storage portion (131) openably and closably provided in a surface of the leg shield (601) on a side of the seat (10). A lower wall (602A2) is formed integrally with the leg shield (601) and formed to cover the storage portion (131) from below. In the windshield structure for the saddle-ride type vehicle, the lower wall (602A2) is formed with an air discharge port (651) for releasing a flow of air from a front side of the vehicle body to a rear side of the leg shield (601).

According to an embodiment of the present invention, since the lower wall for covering from below the storage portion, openably and closably provided in the surface of the leg shield on the side of the seat, is formed with the air discharge port for releasing the flow of air from the front side of the vehicle to the rear side of the leg shield, vacuum behind the leg shield and in the lateral center of the vehicle is reduced to enhance a windshield effect.

According to an embodiment of the present invention, a front cowl (130) may be provided forward of the leg shield (601). An open portion (187) for arranging a front wheel (2) may be formed in a front surface of the front cowl (130) with the air discharge port (651) being arranged above the open portion (187) and directed downwardly and rearwardly. The storage portion (131) may be formed to bulge forward in the leg shield (601) with a wall surface (132C) composing the storage portion (131) being arranged above the air discharge port (651). With this structure, dust, rainwater or the like entering together with the flow of air is less likely to be discharged from the air discharge port.

According to an embodiment of the present invention, the windshield structure for the saddle-ride type vehicle may further include a center tunnel portion (250) connecting the leg shield (601) and a lower portion of the seat (10) with the air discharge port (651) being provided in each of both right and left sides of the center tunnel portion (250). With this structure, by using a shape of the center tunnel portion, the flow of air is guided to the rear side of the leg shield, and the vacuum is effectively reduced.

According to an embodiment of the present invention, the center tunnel portion (250) may be configured such that wall surfaces (53, 54) located adjacent to the air discharge port (651) are inclined toward a center side in a vehicle width direction toward the rear side. With this structure, by using the shape of the center tunnel portion, air from the air discharge port is guided to the lateral center, and the vacuum is effectively reduced.

According to an embodiment of the present invention, a bottom wall (132C) of the storage portion (131) may form a labyrinth passage for the flow of air directed to the air discharge port (651) between the lower wall (602A2) and the bottom wall. With this structure, discharge of dust, rainwater or the like from the air discharge port is further suppressed.

According to an embodiment of the present invention, the storage portion (131) may have a shielding wall (716) extending forward from the storage portion (131), and the shielding wall (716) may be offset on the center side in the vehicle width direction with respect to the air discharge port (651). With this structure, even if the storage portion is compact, the shielding wall effectively shields the dust, rainwater or the like, and the discharge of the dust, rainwater or the like from the air discharge port is further suppressed without enlarging the shielding wall.

According to an embodiment of the present invention, a rib wall (655) may extend from an inner front edge of the air discharge port (651). With this structure, the discharge of the dust, rainwater or the like from the air discharge port is further suppressed by the rib wall.

According to an embodiment of the present invention, the air discharge port for releasing the flow of air from the front side of the vehicle body to the rear side of the leg shield is provided in the lower wall for covering from below the storage portion openably and closably formed in the surface of the leg shield on the side of the seat. Therefore, a vacuum in the vicinity of the lateral center of the vehicle is reduced to enhance the windshield effect.

According to an embodiment of the present invention, the air discharge port is arranged above the open portion formed in the front surface of the front cowl and directed downwardly and rearwardly, the storage portion is formed to bulge forward in the leg shield, and the wall surface composing the storage portion is arranged above the air discharge port. Thereby, dust, rainwater or the like entering together with the flow of air is less likely to be discharged from the air discharge port.

According to an embodiment of the present invention, the air discharge port is provided in each of both the right and left sides of the center tunnel portion for connecting the leg shield and the lower portion of the seat. Thereby, by using the shape of the center tunnel portion, the flow of air is guided to the rear side of the leg shield, and the vacuum is effectively reduced.

According to an embodiment of the present invention, the center tunnel portion is configured such that the wall surface located adjacently to their discharge port is inclined toward the center side in the vehicle width direction toward the rear side. Thereby, by using the shape of the center tunnel portion, the air from the air discharge port is guided to the lateral center, and the vacuum is effectively reduced.

According to an embodiment of the present invention, the bottom wall of the storage portion forms the labyrinth passage for the flow of air directed to the air discharge port between the lower wall for covering the storage portion from below and the bottom wall. Thereby, the discharge of dust, rainwater or the like from the air discharge port is further suppressed.

According to an embodiment of the present invention, the storage portion has the shielding wall extending forward from the storage portion, and the shielding wall is offset on the center side in the vehicle width direction with respect to the air discharge port, above the air discharge port. Thereby, even if the storage portion is compact, the shielding wall effectively shields dust, rainwater or the like, and the discharge of dust, rainwater or the like from the air discharge port is further suppressed without enlarging the shielding wall.

According to an embodiment of the present invention, the rib wall extends from the inner front edge of the air discharge port. Thereby, the discharge of dust, rainwater or the like from the air discharge port is further suppressed by the rib wall.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinafter, one embodiment of the present invention will be described with reference to the drawings. Note that in the explanation the description of front, rear, left, right, upper and lower is the same direction as that of the vehicle body unless otherwise stated. Also, note that as for reference signs shown in each drawing, FR denotes a front side of a vehicle body, UP denotes an upper side of the vehicle body, and LE denotes a left side of the vehicle body.

Figure 1:
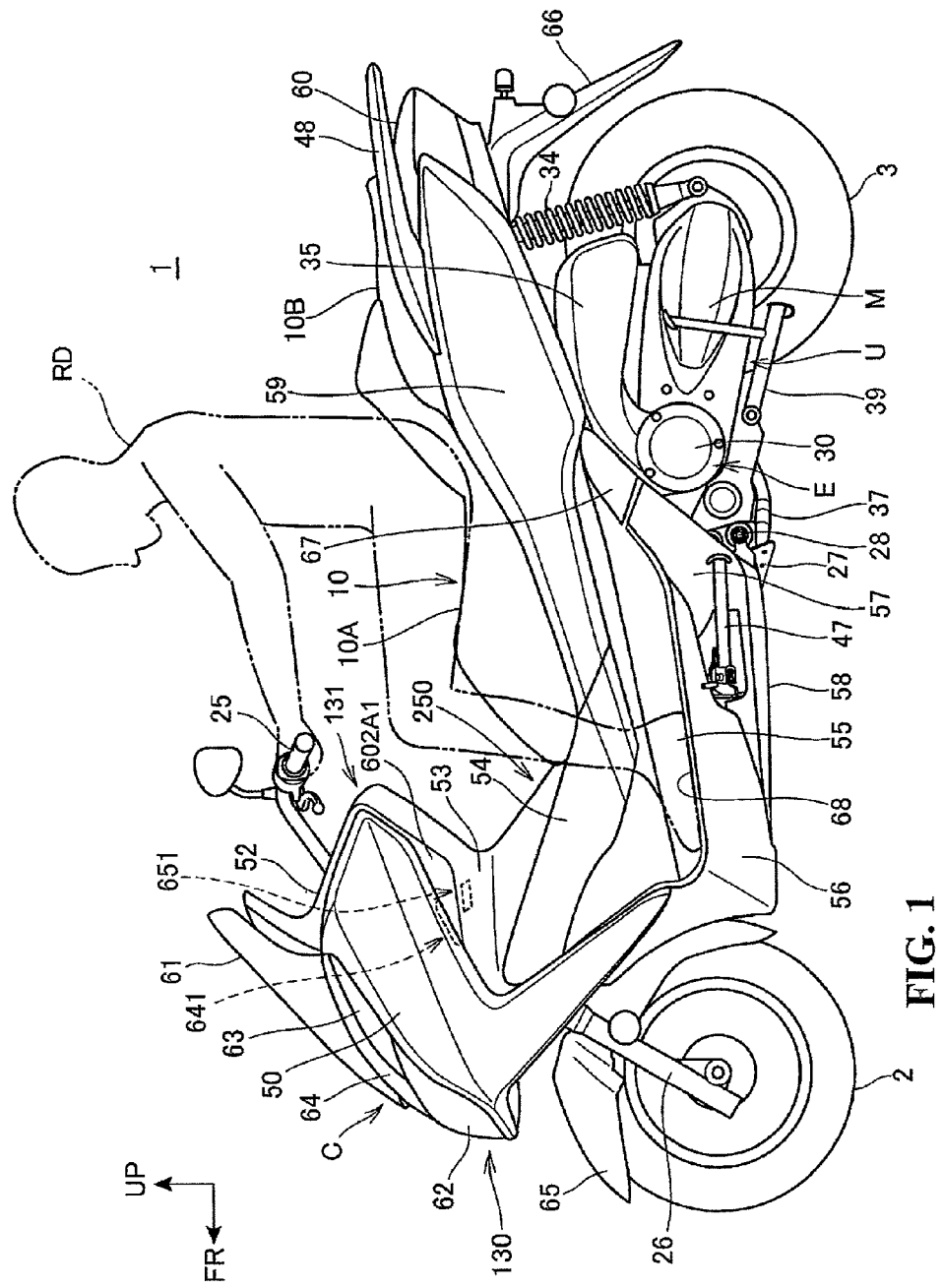
FIG. 1 is a left side view of a motorcycle according to an embodiment of the present invention.
Figure 2:
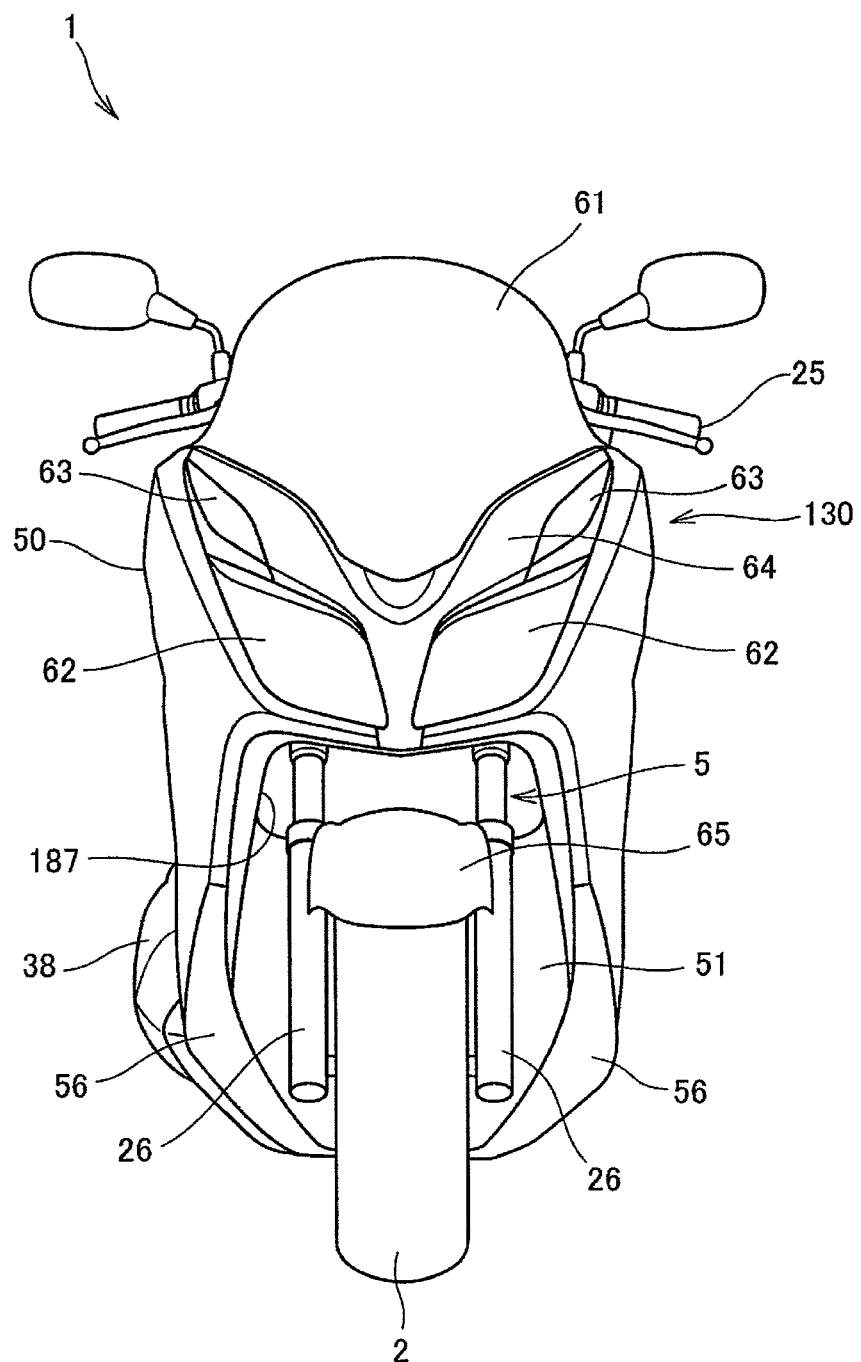
FIG. 2 is a front view of the motorcycle when viewed from the front.

FIG. 1 is a left side view of a motorcycle 1 according to an embodiment of the present invention, and FIG. 2 is a front view of the motorcycle 1 when viewed from the front. Also, FIG. 3 is a left side view of the motorcycle 1, showing an internal structure, and FIG. 4 is a right side view of the motorcycle 1, showing the internal structure.

Figure 3:
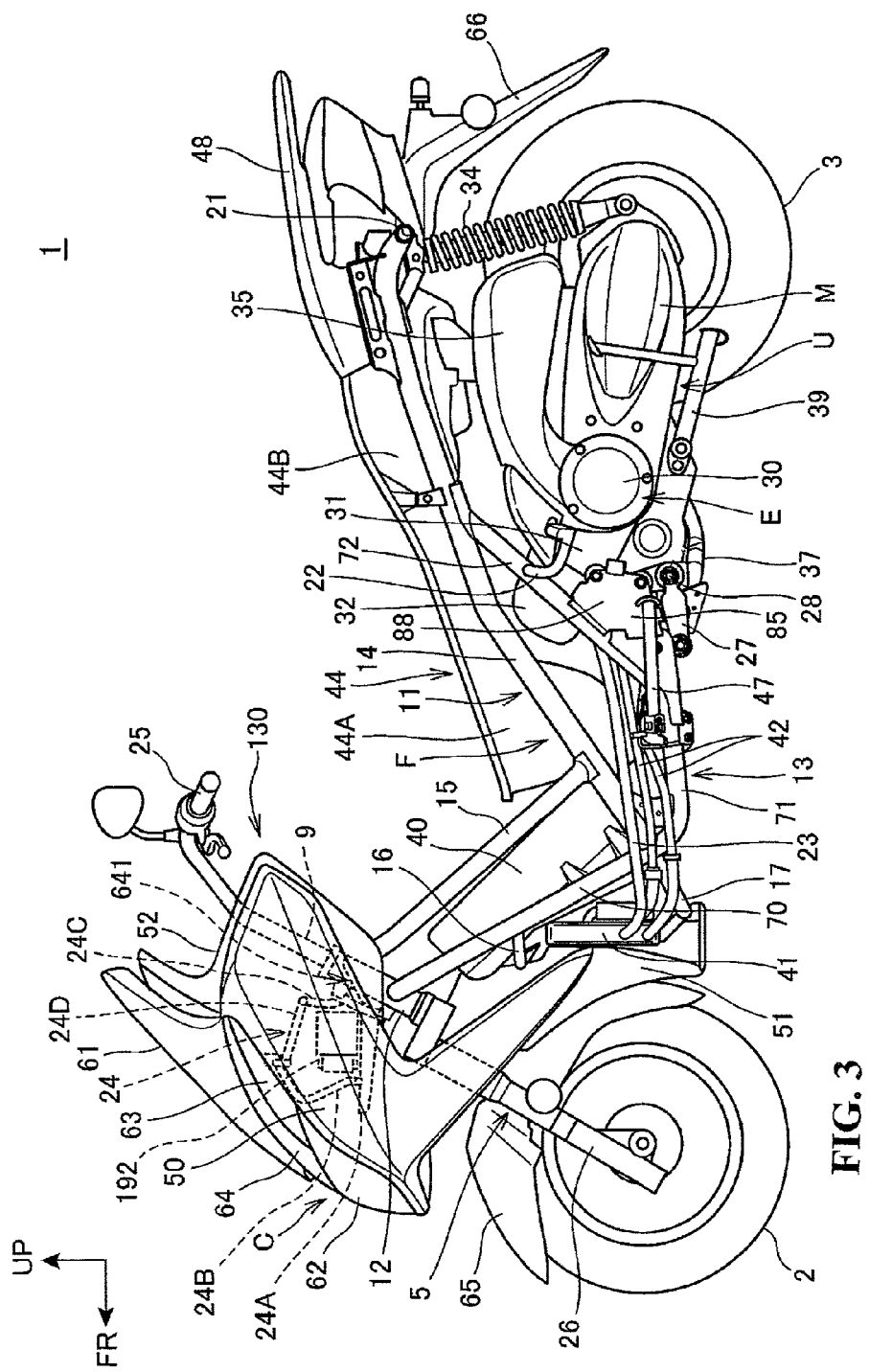
FIG. 3 is a left side view of the motorcycle, showing an internal structure.
Figure 4:
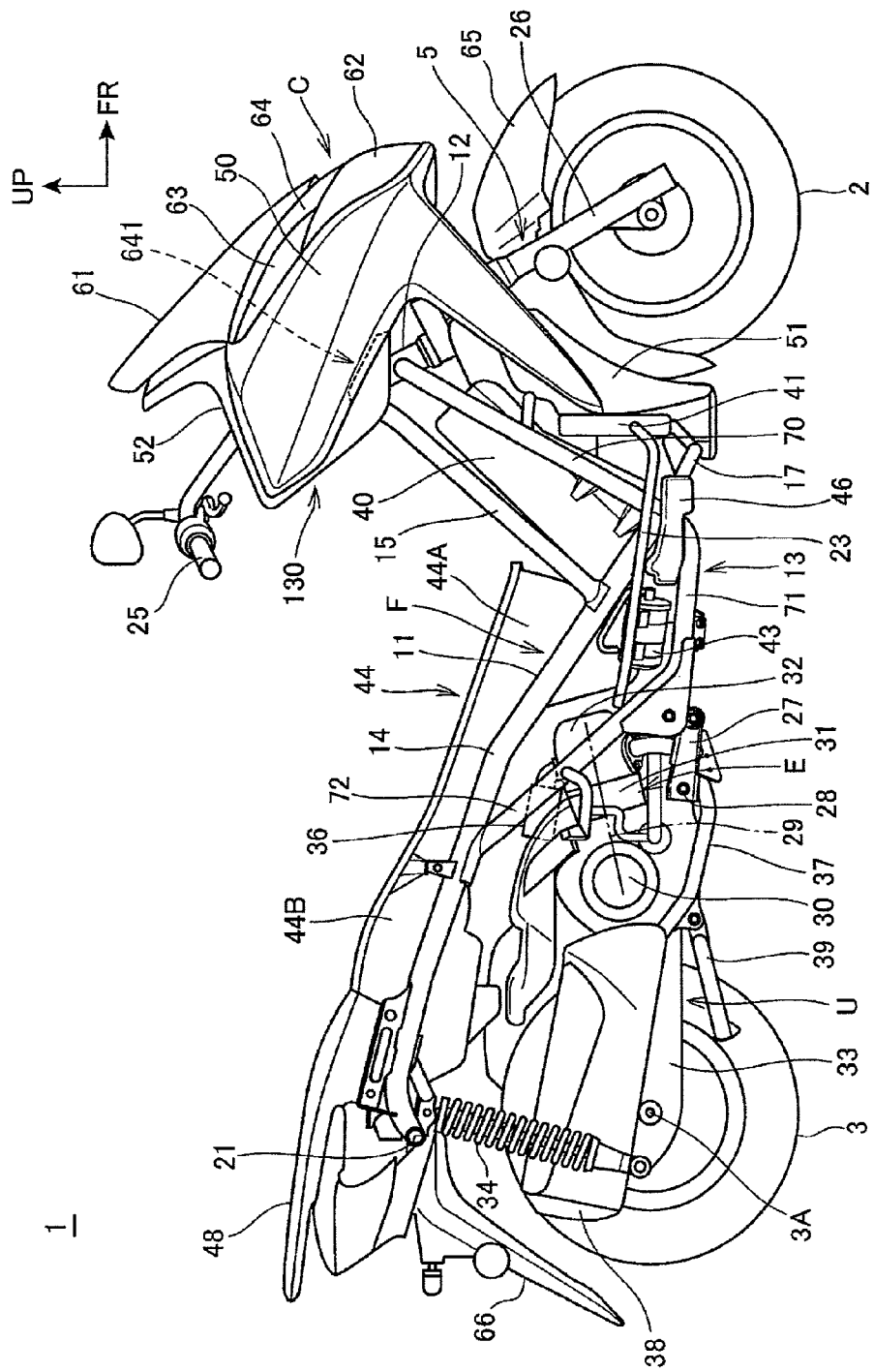
FIG. 4 is a right side view of the motorcycle, showing the internal structure.

The motorcycle (saddle-ride type vehicle) 1 is a scooter type vehicle including a low step floor 68 for placing feet of an occupant (rider) RD seated on a seat 10, and has a front wheel 2 forward of a body frame F (FIG. 3, FIG. 4). A rear wheel 3 as a drive wheel is journaled to a unit swing engine (also called as a unit swing power unit) U arranged on a rear side of the vehicle. The body frame F is covered with a resin vehicle body cover C. Note that in FIG. 3 and FIG. 4, a part of the vehicle body cover C is removed.

Figure 5:
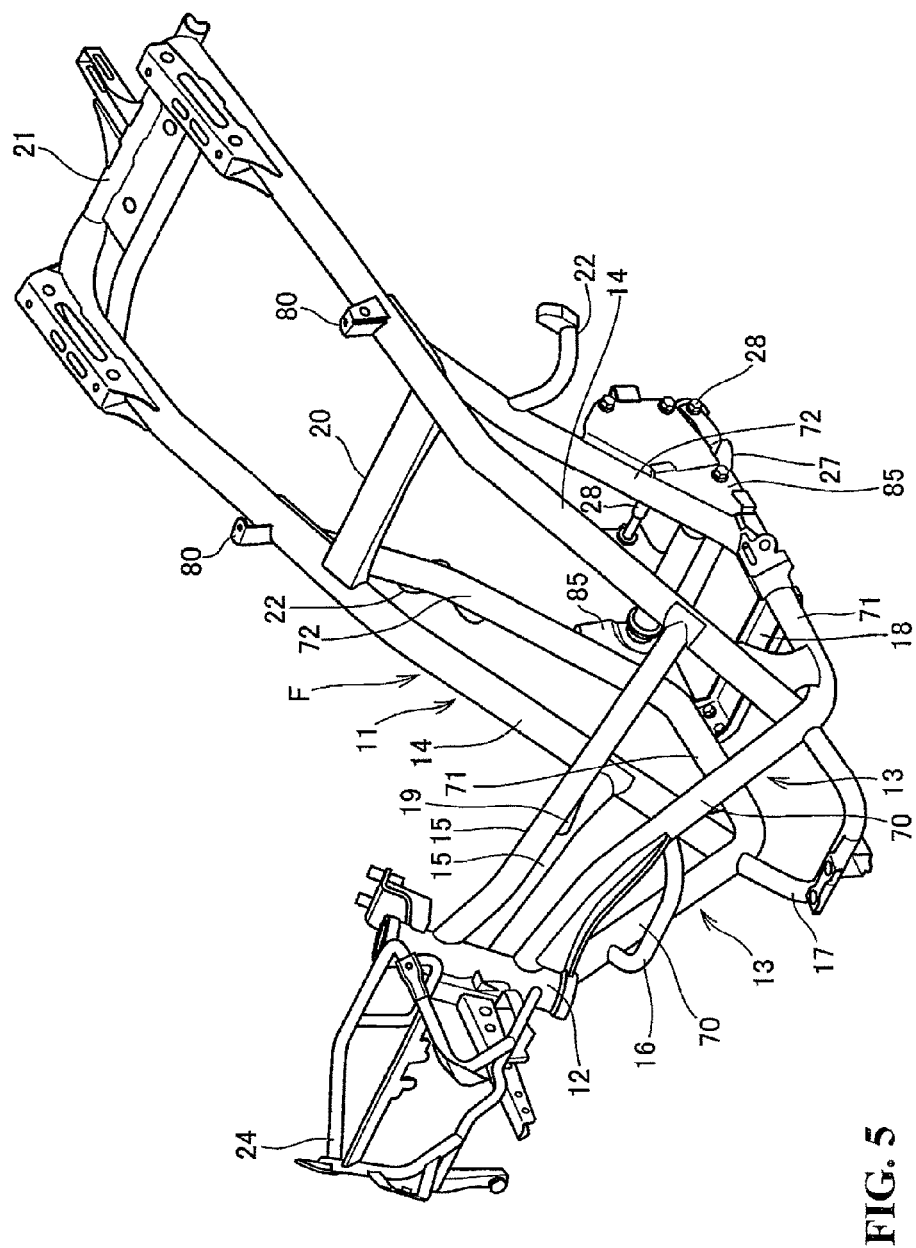
FIG. 5 is a perspective view of a body frame.

FIG. 5 shows the body frame F.

As shown in FIG. 3 to FIG. 5, the body frame F is formed by connecting a plurality of metallic tubes or pipes to each other by welding. A main frame 11 includes a head pipe 12, provided on the front side, a pair of right and left down tubes 13, 13 which extend rearwardly and downwardly from the head pipe 12, which subsequently extend rearwardly substantially horizontally, and which extend rearwardly and upwardly on a rear side. A pair of right and left seat rails 14, 14 extends rearwardly and upwardly to the rear side of the vehicle from the front lower portions of the down tubes 13, 13. A pair of right and left upper tubes 15, 15 extends rearwardly and downwardly above the down tubes 13, 13 from the head pipe 12 and are connected to the seat rails 14, 14.

Each of the down tubes 13, 13 includes a downwardly extending portion 70 having a front end connected to the head pipe 12 and extending rearwardly and downwardly. A horizontal extending portion 71 extends substantially horizontally rearwardly from a lower end of the downwardly extended portion 70. An obliquely upwardly extending portion 72 extends rearwardly and upwardly from a rear end of the horizontal extended portion 71.

As shown in FIG. 5, as cross members for connecting the right and left frames to each other, the main frame 11 includes a front upper cross member 16 for connecting the upper portions of the downwardly extending portions 70, 70 of the down tubes 13, 13 to each other with a front cross member 17 for connecting the lower portions of the downwardly extending portions 70, 70 to each other. A horizontal portion cross member 18 connects the horizontal extending portions 71, 71 of the down tubes 13, 13 to each other. An upper cross member 19 connects the upper tubes 15, 15 to each other. An intermediate cross member 20 connects the seat rails 14, 14 to each other and a rear cross member 21 connects the rear portions of the seat rails 14, 14 to each other. The horizontal portion cross member 18 is connected to the horizontal extended portions 71, 71 with bolts.

The upper portions of the obliquely upwardly extended portions 72, 72 of the down tubes 13, 13 are provided with a pair of right and left tandem step stays 22, 22 extending outwardly in a vehicle width direction.

A basket-shaped front frame 24 for supporting lamps, the vehicle body cover C or the like is connected to the front surface of the head pipe 12.

According to an embodiment of the present invention, a pair of right and left step frames 23 (FIG. 3, FIG. 4), connected to the down tubes 13, 13 extending in a longitudinal direction for supporting the step floor 68 from below, is provided on an outer side of the main frame 11.

As shown in FIG. 3 to FIG. 5, a steering system 5 for steering the front wheel 2 includes a steering shaft 9 (FIG. 3) rotatably journaled to the head pipe 12 and a handlebar 25 connected to an upper portion of the steering shaft. A lower end of the steering shaft 9 is connected to a pair of right and left front forks 26, 26, and the front wheel 2 is journaled to the lower ends of the front forks 26, 26 and steered by operation of the handlebar 25.

The unit swing engine U (FIG. 1, FIG. 3, FIG. 4) is a unit swing type configured such that an engine E and a transmission case M for storing a belt-type continuously variable transmission mechanism are integrated with each other, and also functions as a swing arm for supporting the rear wheel 3. The unit swing engine U is connected to the rear portions of the down tubes 13, 13 through a link member 27 connected to the front portion of the unit swing engine, and is configured swingably in a vertical direction around a pivot shaft 28 provided to the link member 27. A front end of the link member 27 is connected to the rear portions of the down tubes 13, 13 through a pair of right and left power unit supporting portions 85, 85.

The engine E is a water-cooled four-cycle single cylinder engine, and is disposed so that a cylinder axis 29 extends forward substantially horizontally. The engine E is so configured that a cylinder 31 and a cylinder head 32 (FIG. 4) are connected to the front surface of a crankcase 30 disposed at the front of the unit swing engine U.

The transmission case M extends rearwardly via the left side of the rear wheel 3 from the rear portion of the crankcase 30. The rear portion of the crankcase 30 is provided with an arm portion 33 (FIG. 4) extending rearwardly via the right side of the rear wheel 3. The rear wheel 3 is supported by an axle 3A provided between the rear portion of the transmission case M and the rear portion of the arm portion 33. Output of the engine E is transmitted to the rear wheel 3 through the continuously variable transmission mechanism.

A pair of right and left rear suspensions 34, 34 is laid among the rear end of the transmission case M, the rear end of the arm portion 33, and the seat rails 14, 14.

An air cleaner box 35 (FIG. 1, FIG. 3) for sucking outside air is provided on the upper surface of the transmission case M. The air cleaner box 35 is connected to a throttle body 36 (FIG. 4) connected to a suction port formed in an upper surface of the cylinder head 32 through an unillustrated connecting tube.

An exhaust pipe 37 connected to an exhaust port formed in the lower surface of the cylinder head 32 extends rearwardly via a portion below the engine E, and is connected to a muffler 38 (FIG. 4) fixed on the outer side (right side) of the arm portion 33.

A main stand 39 supporting the vehicle in an upright manner is provided below the rear portion of the transmission case M.

In a side view, a fuel tank 40 for storing fuel for the engine E is formed in such a manner that a front surface thereof is arranged along the downwardly extending portions 70 of the down tubes 13 and a rear surface thereof is arranged along the upper tubes 15. In the vertical direction, the fuel tank extends vertically long from behind the lower portion of the head pipe 12 to the vicinity of the horizontal extended portions 71 of the down tubes 13. The fuel tank 40 is arranged to be forwardly inclined between the right and left down tubes 13, 13.

A plate-like radiator 41 for cooling water for the engine E is provided in a space below the front portion of the forwardly inclined fuel tank 40. A pair of cooling water pipes 42 (FIG. 2) for connecting the radiator 41 and the engine E extends from the left portion of the radiator 41, extends rearwardly below the step frame 23 (FIG. 3) on the left side (one side) of the vehicle, and is connected to the engine E via the inner sides of the down tubes 13.

A side stand 47 is attached to the left horizontal extended portion 71.

A reservoir tank 46 (FIG. 4) for storing a part of the cooling water for the radiator 41 is arranged below the step frame 23 on the right side (the other side) of the vehicle behind the radiator 41. In addition, a canister 43 (FIG. 4) for adsorbing evaporated fuel in the fuel tank 40 is arranged below the right step frame 23 behind the reservoir tank 46.

A storage box 44 (FIG. 3, FIG. 4) for storing goods is attached to the seat rails 14, 14 through box stays 80, 80 (FIG. 5) provided to the seat rails 14, 14. The storage box 44 is disposed between the seat rails 14, 14, and extends upwardly to the rear along the seat rails 14, 14 from the vicinity of the rear portion of the fuel tank 40 to the upside of the transmission case M. The storage box 44 is configured such that a front storage portion 44A disposed between the fuel tank 40 and the obliquely upwardly extended portions 72 of the down tubes 13. A rear storage portion 44B disposed above the unit swing engine U is integrally formed by resin molding.

The upper surface of the storage box 44 is opened over the whole length, and the opening thereof is openably closed by the seat 10 (FIG. 1) for the occupant. The seat 10 has a front seat 10A on which the rider is seated and a rear seat 10B which is formed higher by one step than the front seat 10A and on which the occupant is seated.

A grab rail 48 is fixed to the rear portions of the seat rails 14, 14 behind the storage box 44.

As shown in FIG. 1 and FIG. 2, the vehicle body cover C includes a front cover 50 for covering the front side and right and left sides of the head pipe 12 and extending downwardly on the front side of the downwardly extending portions 70. A front lower cover 51 (FIG. 2) is connected to the lower portion of the front cover 50 with an upper cover 52 connected to the upper portion of the front cover 50 below the handlebar 25. An upper inner cover 53 (FIG. 1) is connected to the right and left edges of the front cover 50 for covering the head pipe 12, the upper tubes 15, 15 and the downwardly extending portions 70 from behind and from a lateral side. A pair of right and left lower inner covers 54, 54 (FIG. 1) are connected to the lower edge of the upper inner cover 53 for covering the upper tubes 15, 15 and the downwardly extending portions 70. A pair of right and left step covers 55, 55 (FIG. 1) are connected to the lower portion of the front cover 50 and the lower edges of the lower inner covers 54, 54 for covering the step frames 23, 23 from above. A pair of right and left front floor skirts 56, 56 are connected to the lower portion of the front cover 50 and the lower portions of the step covers 55, 55 for covering the step frames 23, 23 from the lateral side. A pair of right and left rear floor skirts 57, 57 (FIG. 1) extend rearwardly in continuity with the front floor skirts 56, 56 and which cover the down tubes 13, 13. An undercover 58 (FIG. 1) covers the right and left horizontal extending portions 71, 71 from below with a pair of right and left body side covers 59, 59 (FIG. 1) connected to the rear portions of the lower inner covers 54, 54 and the step covers 55, 55 for covering the storage box 44 and the seat rails 14, 14 from the lateral side below the seat 10. A tail cover 60 (FIG. 1) is connected to the rear portions of the body side covers 59, 59.

The step floor 68 (FIG. 1) for placing the foot of the rider seated on the front seat 10A is formed on each of the bottom portions of the right and left step covers 55, 55.

The upper inner cover 53, the lower inner covers 54, 54 and the step covers 55, 55 are components for forming the center tunnel portion 250 (FIG. 1) arranged below a portion between the handlebar 25 and the seat 10.

The center tunnel portion 250 connects the lower portion of the seat 10 and a leg shield 601 described later so that the fuel tank 40 and the pair of right and left upper tubes 15, 15 arranged in a position higher than the right and left step floors 68 are covered from above.

In the center tunnel portion 250, a portion located adjacently to the leg shield 601, that is, a straddling portion 250A composed of the upper inner cover 53 and the lower inner covers 54, 54 is inclined to be closer to the center side of a vehicle width toward the rear side. Thus, improving the convenience in getting in/out of the vehicle for the occupant RD.

The front portion of the front cover 50 is provided with a windscreen 61 extending rearwardly and upwardly. A head light 62 is provided at a front end of the front cover 50, and a pair of right and left blinkers 63 is provided in continuity with the upper portion of the head light 62. A plate-like garnish 64 is provided between the head light 62 and the windscreen 61.

The front forks 26, 26 are provided with a front fender 65 for covering the front wheel 2 from above. An open portion 187 (FIG. 2) for arranging the front wheel 2 is formed between the upper portion of the front lower cover 51 and the front cover 50 above the front fender 65, and the steering system 5 vertically extends penetratingly through the open portion 187.

A rear fender 66 for covering the rear wheel 3 from above is provided below the body side covers 59, 59.

A pair of folding tandem steps 67 (FIG. 1) for placing the feet of the occupant on the rear seat 10B is supported by the tandem step stays 22, 22.

A foremost cover 130 as a front cowl for covering the vicinity of the head pipe 12 (the front portion of the vehicle) is composed of the front cover 50, the upper cover 52, and the upper inner cover 53.

Figure 6:
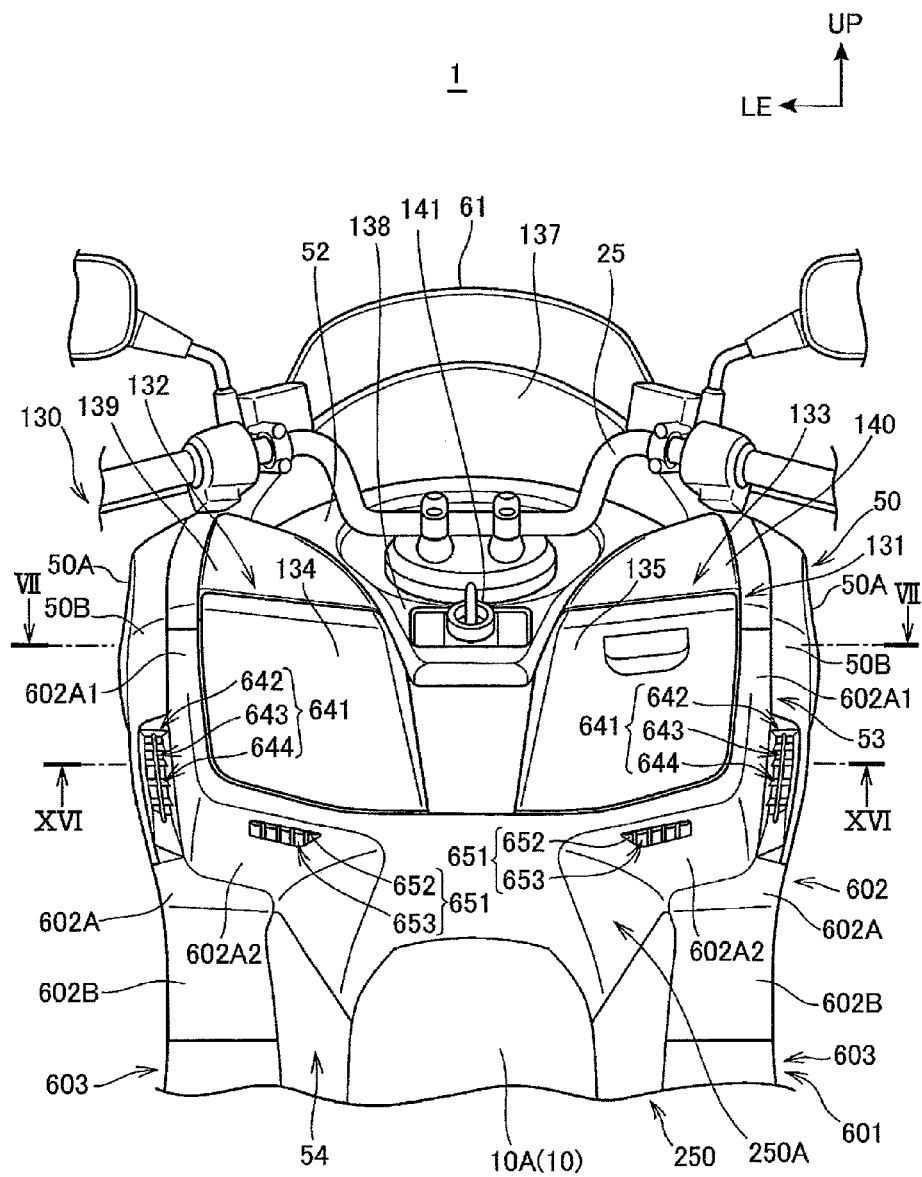
FIG. 6 is a view of a front side of a vehicle body when viewed from behind.

FIG. 6 is a view of a front side of a vehicle body when viewed from behind (a side of the seat 10).

The foremost cover 130 is provided with a front storage box (storage portion) 131 storing objects to be stored. The front storage box 131 has a goods storage portion 132 provided on the left side of the head pipe 12, and a goods storage portion 133 (storage portion) provided on the right side of the head pipe 12. Note that cover members 134, 135 are provided for opening the goods storage portions 132, 133.

Figure 7:
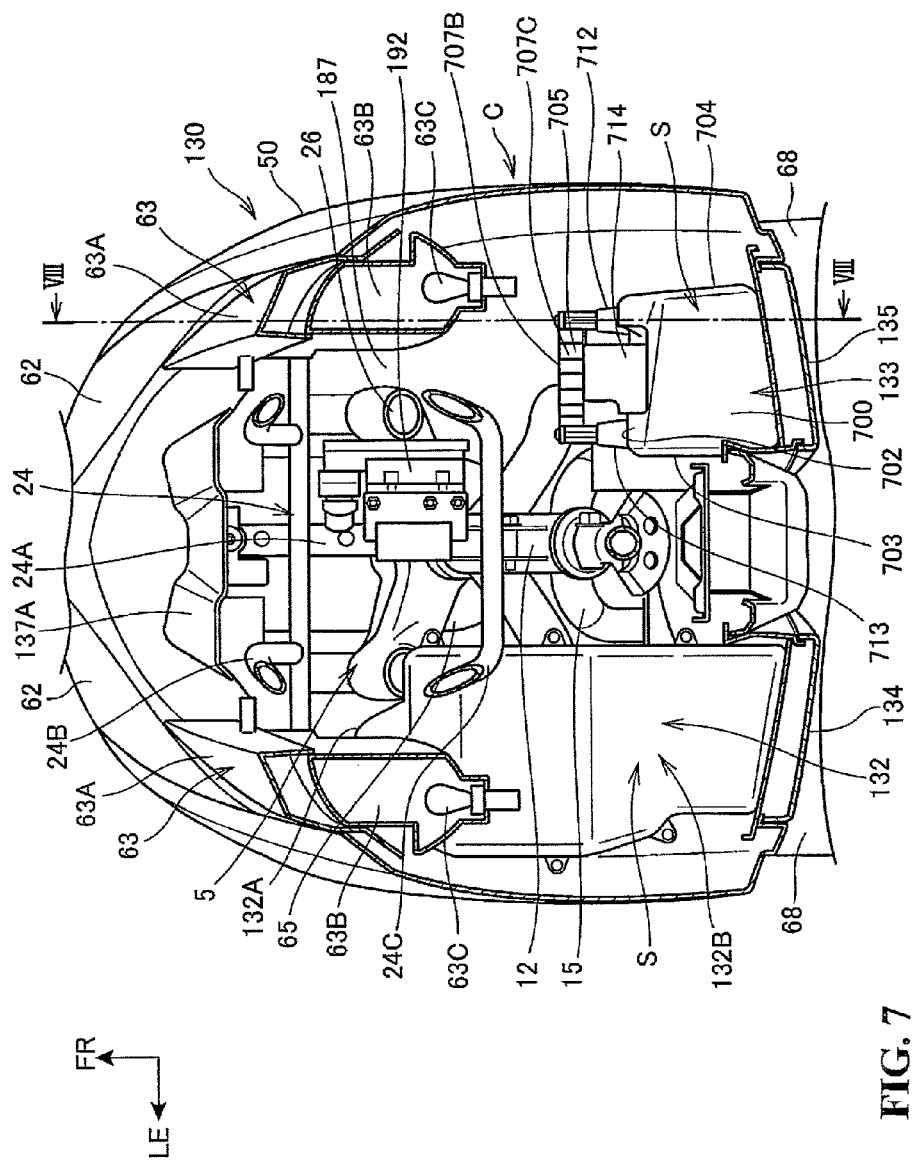
FIG. 7 is a cross-sectional view taken along line VII-VII of FIG. 6.
Figure 8:
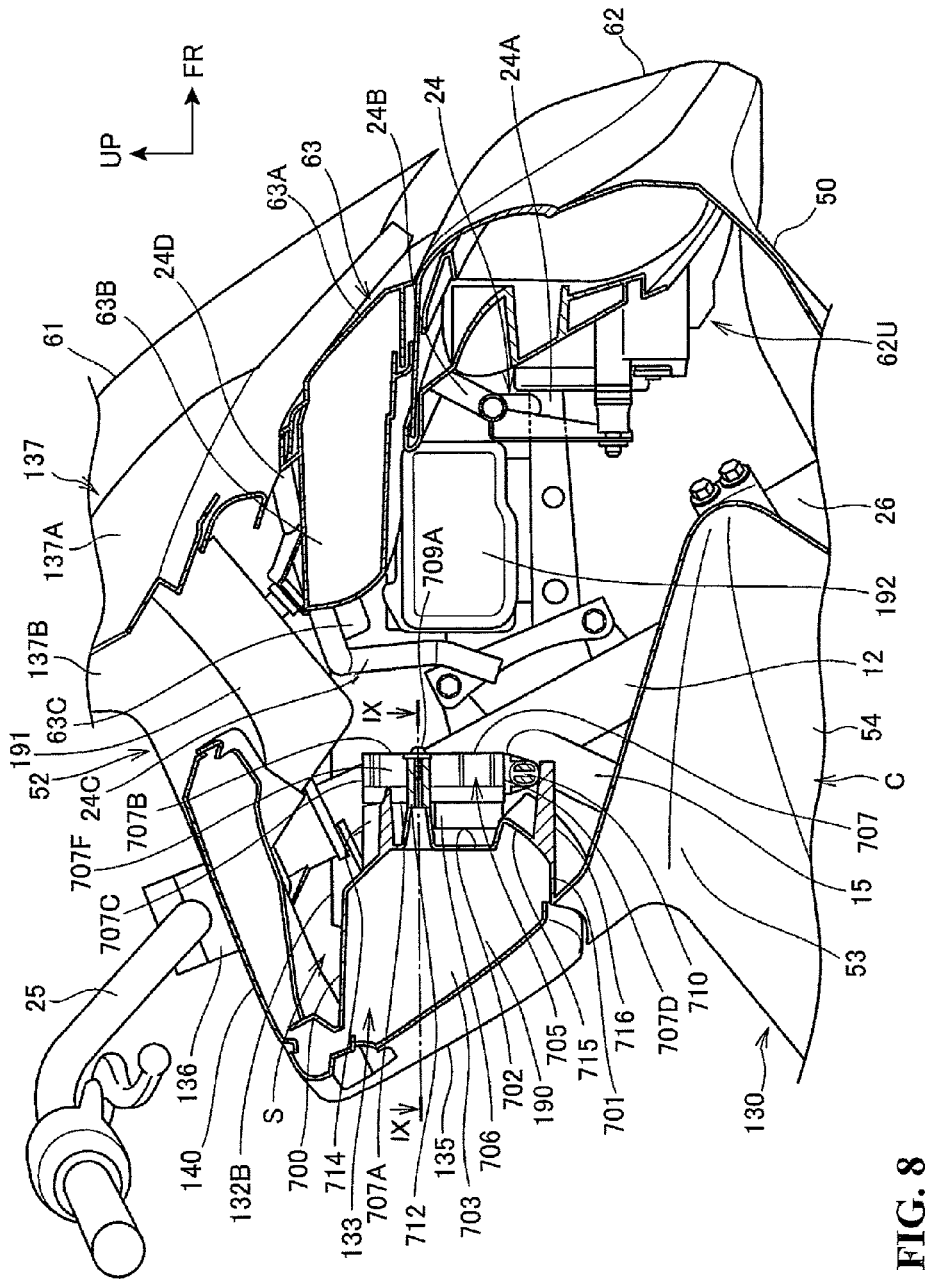
FIG. 8 is a cross-sectional view taken along line VIII-VIII of FIG. 7.

FIG. 7 is a cross-sectional view taken along line VII-VII of FIG. 6, and FIG. 8 is a cross-sectional view taken along line VIII-VIII of FIG. 7.

As shown in FIG. 7 and FIG. 8, the basket-shaped front frame 24 fixed on the front surface of the head pipe 12 is arranged in the foremost cover 130. The front frame 24 includes a single lower frame 24A disposed in the center of the vehicle width (equivalent to the lateral center) and extending forwardly. A front casing-shaped frame 24B is connected to the front portion of the lower frame 24A and extends vertically with a rear casing-shaped frame 24C for connecting to the rear portion of the lower frame 24A and extending vertically. An upper frame 24D connects in a longitudinal direction the upper portion of the front casing-shaped frame 24B and the upper portion of the rear casing-shaped frame 24C.

The head light 62 is fixed on the front side of the front casing-shaped frame 24B, and is arranged at the front end of the front cover 50. Each of the blinkers 63, 63 has a blinker lens 63A exposed outside, and a bulb storage portion 63B arranged inside of the foremost cover 130. Each bulb 63C emitting light is provided at the rear end of each bulb storage portion 63B. Each bulb storage portion 63B is arranged on each of the right and left sides of the front frame 24 in an upward rear direction of the head light 62.

A meter visor 137 has a front meter visor 137A (FIG. 8) with the windscreen 61 fixed, and a rear meter visor 137B (FIG. 8) connected to the rear portion of the front meter visor 137A. A meter unit 191 (FIG. 8) displaying vehicle speed or the like is exposed upwardly from an opening formed in the rear meter visor 137B provided forward of a pair of left and right upper covers 139, 140 positioned below the handlebar 25 and supported by the upper portion of the front frame 24. The upper covers 139, 140 are arranged obliquely downwardly to the rear from the rear portion of the meter unit 191 toward the side of the seat 10.

A center panel 138 (FIG. 6) behind a handlebar post 136 is provided with a key cylinder portion 141 (FIG. 6) which is operated by a main key to switch on/off an ignition switch of the vehicle.

As shown in FIG. 7 and FIG. 8, an ABS modulator (ABS unit) 192 for controlling locking of a braking device (not shown) for the vehicle is supported on the lower frame 24A between the front casing-shaped frame 24B and the rear casing-shaped frame 24C, and arranged closer to a side of the right bulb storage portion 63B than the center in the vehicle width direction. The ABS modulator 192 controls fluid pressure of the braking device for the front wheel 2 and the rear wheel 3 to control the locking of the braking device, is formed into a box shape, and is internally provided with a plurality of control valves.

The right goods storage portion 133 is formed into a box shape having a substantially rectangular parallelepiped bulging forward above the upper inner cover 53, and includes a ceiling wall 700 extending forward substantially horizontally, a bottom wall 701 opposed to the ceiling wall 700, an innermost wall 702 connecting the front edges of the ceiling wall 700 and the bottom wall 701, and a left sidewall 703 and a right sidewall 704 that are laid between both the right and left ends of the ceiling wall 700, the bottom wall 701 and the innermost wall 702. A right opening 190 is provided substantially oppositely to the innermost wall 702.

The goods storage portion 133 is arranged rearwardly in comparison with the front frame 24 on the right side of the head pipe 12, and the innermost wall 702 is positioned rearwardly in comparison with the rear casing-shaped frame 24C and the right bulb storage portion 63B.

The left goods storage portion 132 is formed into the box shape having the substantially rectangular parallelepiped bulging forward above the upper inner cover 53, and is formed into a large storage portion longer in the longitudinal direction than the right goods storage portion 133. The goods storage portion 132 is arranged on the left side of the head pipe 12 and extends to the lower portion of the bulb storage portion 63B. The innermost wall 132A is positioned between the front casing-shaped frame 24B and the rear casing-shaped frame 24C.

The goods storage portions 132, 133 are arranged to be separated downwardly from the upper covers 139, 140 (FIG. 6), and each space S (FIG. 7, FIG. 8) is formed between the upper wall 132B of the goods storage portion 132 and the upper cover 139, and between the ceiling wall 700 of the goods storage portion 133 and the upper cover (instrumental panel) 140. In each space S, components prepared as options for the vehicle, for example, a speaker for an acoustic device, can be arranged instead of the upper covers 139, 140.

A box-shaped burglary suppression device 705 (FIG. 7, FIG. 8) is fixed on the innermost wall 702 of the right goods storage portion 133. The burglary suppression device 705 includes an acceleration sensor (not shown) for detecting vibration applied to the vehicle during operation of a system for the burglary suppression device 705, and an alarm device 706 (FIG. 8) for generating an alarm horn sound based on a detection value from the acceleration sensor. Also, the burglary suppression device 705 is wired and connected to the ignition switch of the key cylinder portion 141 (FIG. 6), and has a function of transmitting a signal to the alarm device 706 and emitting the alarm horn sound by the alarm device 706 when the key cylinder portion 141 is operated during the operation of the burglary suppression device 705.

According to the present embodiment, since the burglary suppression device 705 is fixed on the innermost wall 702 of the goods storage portion 133 and the burglary suppression device 705 is arranged forward from the innermost wall 702, each space S is ensured above the goods storage portion 133 and the optional components such as the speaker can be arranged in each space S.

Figure 9:
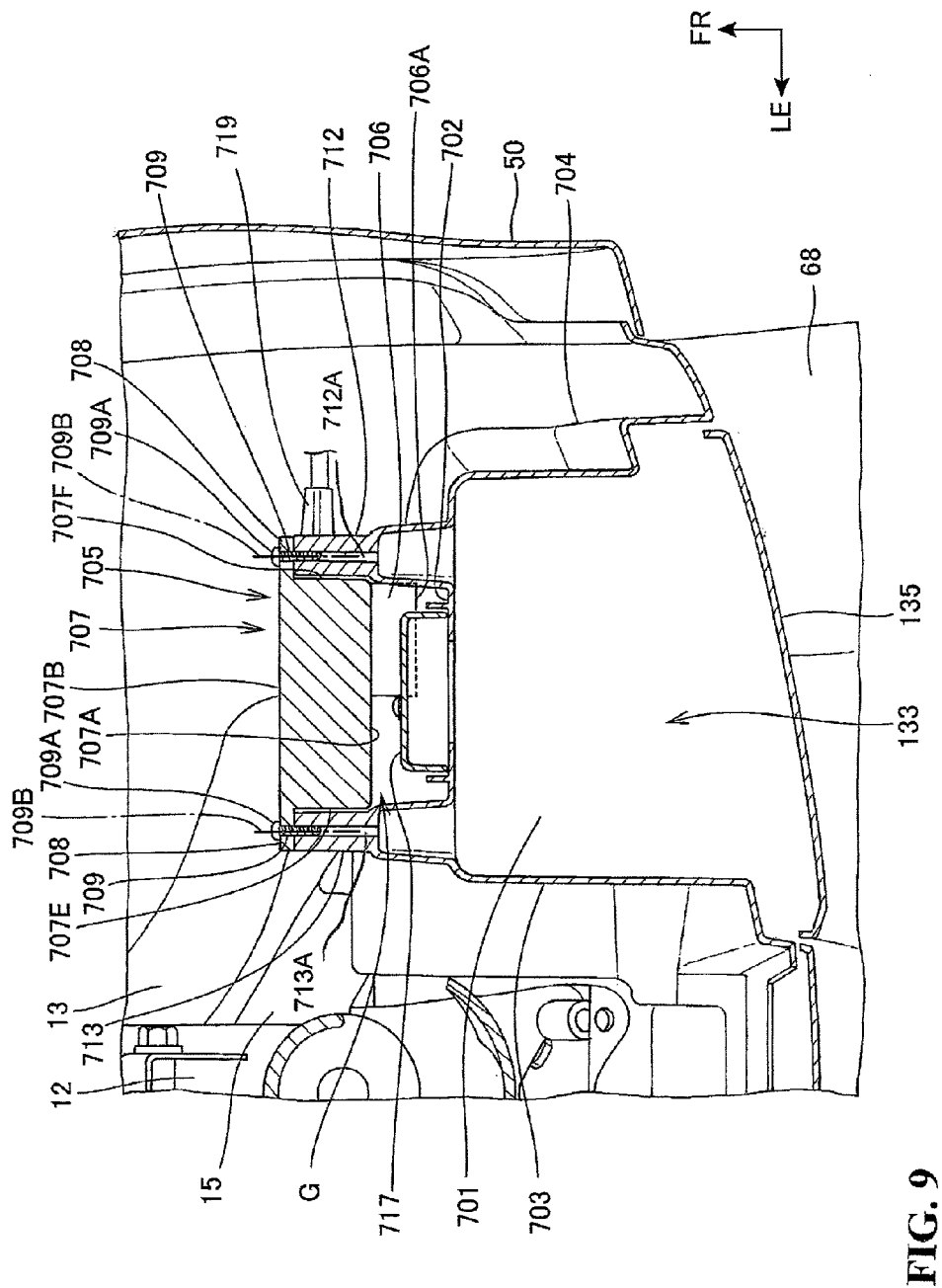
FIG. 9 is a view showing a horizontal section of a burglary suppression device together with a peripheral structure (cross-sectional view taken along line IX-IX of FIG. 8)
Figure 10:
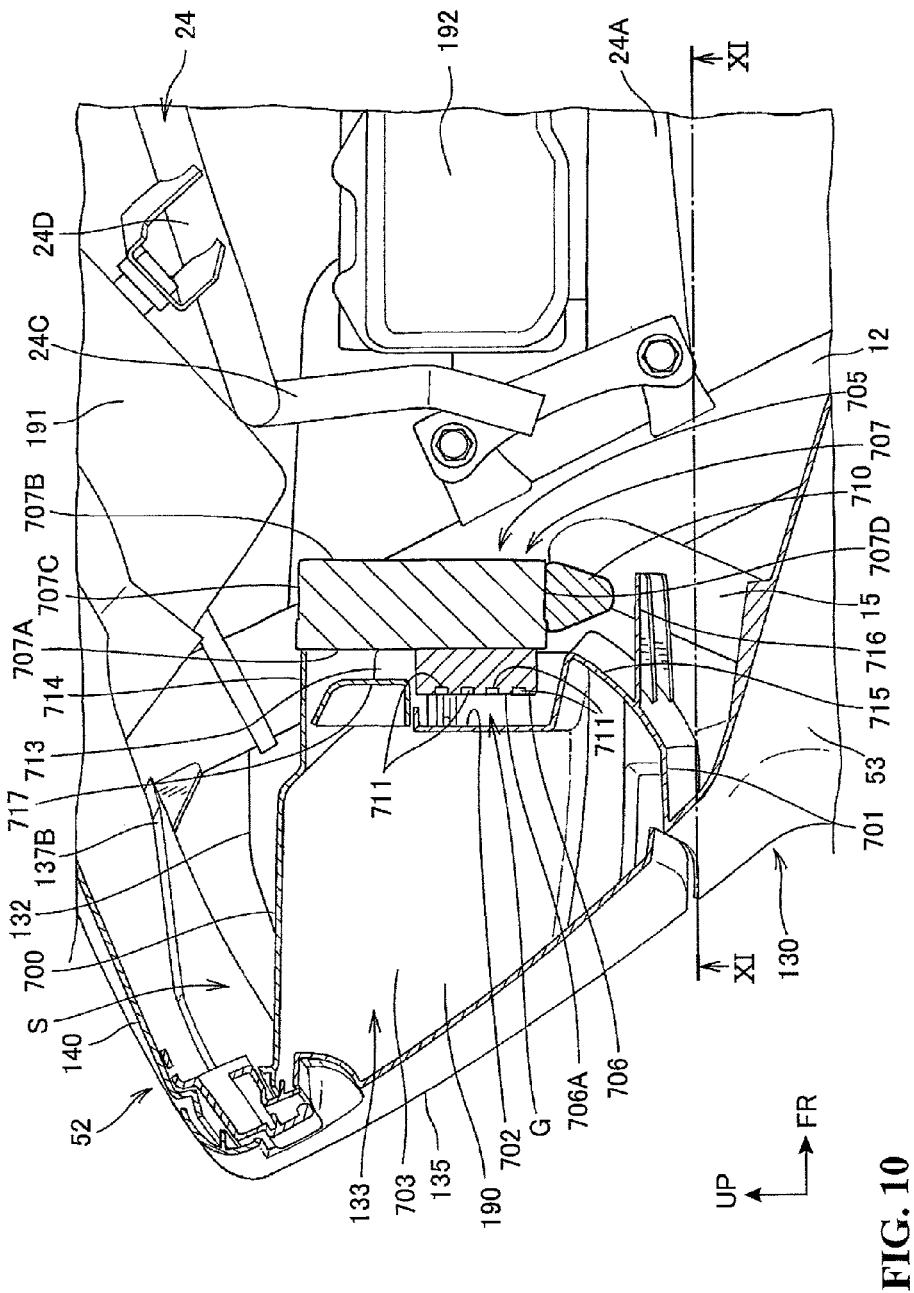
FIG. 10 is a view showing a vertical section of the burglary suppression device together with the peripheral structure.

FIG. 9 is a view showing a horizontal section of the burglary suppression device 705 together with a peripheral structure (cross-sectional view taken along line IX-IX of FIG. 8), and FIG. 10 is a view showing a vertical section of the burglary suppression device 705 together with the peripheral structure.

As shown in FIG. 7 to FIG. 10, the burglary suppression device 705 has a case 707 formed into a substantially rectangular parallelepiped, and the case 707 has an opposed wall portion 707A (opposed surface) opposed to the innermost wall 702 of the goods storage portion 133, a front wall portion 707B opposed to the opposed wall portion 707A and positioned forward of the opposed wall portion 707A, an upper wall portion 707C and a lower wall portion 707D for connecting the opposed wall portion 707A and the front wall portion 707B through an upper end and a lower end, and a left wall portion 707E and a right wall portion 707F for connecting the opposed wall portion 707A and the front wall portion 707B through a left end and a right end.

The upper portions of the left wall portion 707E and the right wall portion 707F are provided with platelike fastening portions 708, 708 that are formed in continuity with the front wall portion 707B and which extend outwardly in the vehicle width direction. The fastening portions 708 are formed with screw holes 709. The burglary suppression device 705 is fixed on the innermost wall 702 with screws 709A inserted into the screw holes 709. The axis 709B (fastening shaft) of each screw hole 709 extends in the longitudinal direction.

The lower wall portion 707D of the burglary suppression device 705 is provided with a connector portion 710 (FIG. 8), and wiring 719 (FIG. 9) for connecting the burglary suppression device 705 to the ignition switch of the key cylinder portion 141 is detachably connected to the connector portion 710.

The alarm device 706 is formed into a square shape, and is arranged close to the side of the right wall portion 707F below the outer surface of the opposed wall portion 707A. A back surface 706A of the alarm device 706 is formed with slits 711 (FIG. 10), and the alarm horn sound from the alarm device 706 is emitted to the outside through the slits 711.

The upper portion of the innermost wall 702 of the goods storage portion 133 is formed with a columnar outer boss portion 712 projecting forward in the vicinity of the right sidewall 704, and a columnar inner boss portion 713 positioned inside in the vehicle width direction of the outer boss portion 712 and projecting forward in the vicinity of the left sidewall 703. The projecting height of the outer boss portion 712 and the projecting height of the inner boss portion 713 are formed to be substantially the same, and the top portions of the outer boss portion 712 and the inner boss portion 713 are formed with screw holes 712A, 713A for screwing the screws 709A. Also, an upper bulged portion 717 with a part of the innermost wall 702 projecting forward is formed between the outer boss portion 712 and the inner boss portion 713 on the upper portion of the innermost wall 702.

The burglary suppression device 705 is fixed on the innermost wall 702 in such a manner that the fastening portions 708, 708 abut on the top portions of the outer boss portion 712 and the inner boss portion 713 in a direction with the slits 711 opposed to the innermost wall 702, and the screws 709A are fastened from the front.

With the burglary suppression device 705 fixed on the innermost wall 702, the burglary suppression device 705 is arranged to be stored inside of a surface with the innermost wall 702 projecting forward. The upper wall portion 707C and the lower wall portion 707D are positioned between the ceiling wall 700 and the bottom wall 701 in a height direction, and the left wall portion 707E and the right wall portion 707F are positioned between the left sidewall 703 and the right sidewall 704 in the vehicle width direction.

The projecting height of the outer boss portion 712 and the projecting height of the inner boss portion 713 are set to form a clearance G (FIG. 9, FIG. 10) among the opposed wall portion 707A of the burglary suppression device 705, the slits 711, and the innermost wall 702 of the goods storage portion 133. The alarm horn sound from the alarm device 706 is emitted from the slits 711, hits on the innermost wall 702 so as to be reflected, and is transmitted to the outside through the clearance G.

In this way, the burglary suppression device 705 is concealed by arranging the slits 711 in a direction opposed to the innermost wall 702. Thereby, water and/or dust are prevented from intruding into the burglary suppression device 705 through the slits 711. Also, the burglary suppression device 705 is fixed with the clearance G ensured by the outer boss portion 712 and the inner boss portion 713. Thereby, the alarm horn sound is effectively transmitted to the outside through the clearance G. For this reason, both waterproof property/dust resistance and a burglary suppressing effect are achieved.

As shown in FIG. 10, the rear portion of the ceiling wall 700 of the goods storage portion 133 is formed with an extended wall portion 714 extending forward substantially horizontally to a position overlapping with the upper wall portion 707C, and the upper portion of the space formed by the clearance G is partially covered with the extended wall portion 714.

The lower portion of the innermost wall 702 is formed with a bulged wall portion 715 bulging to the vicinity of the opposed wall portion 707A below the lower wall portion 707D of the burglary suppression device 705, and the lower portion of the space formed by the clearance G is partially covered with the bulged wall portion 715. A gap is ensured between the bulged wall portion 715 and the lower wall portion 707D.

Figure 11:
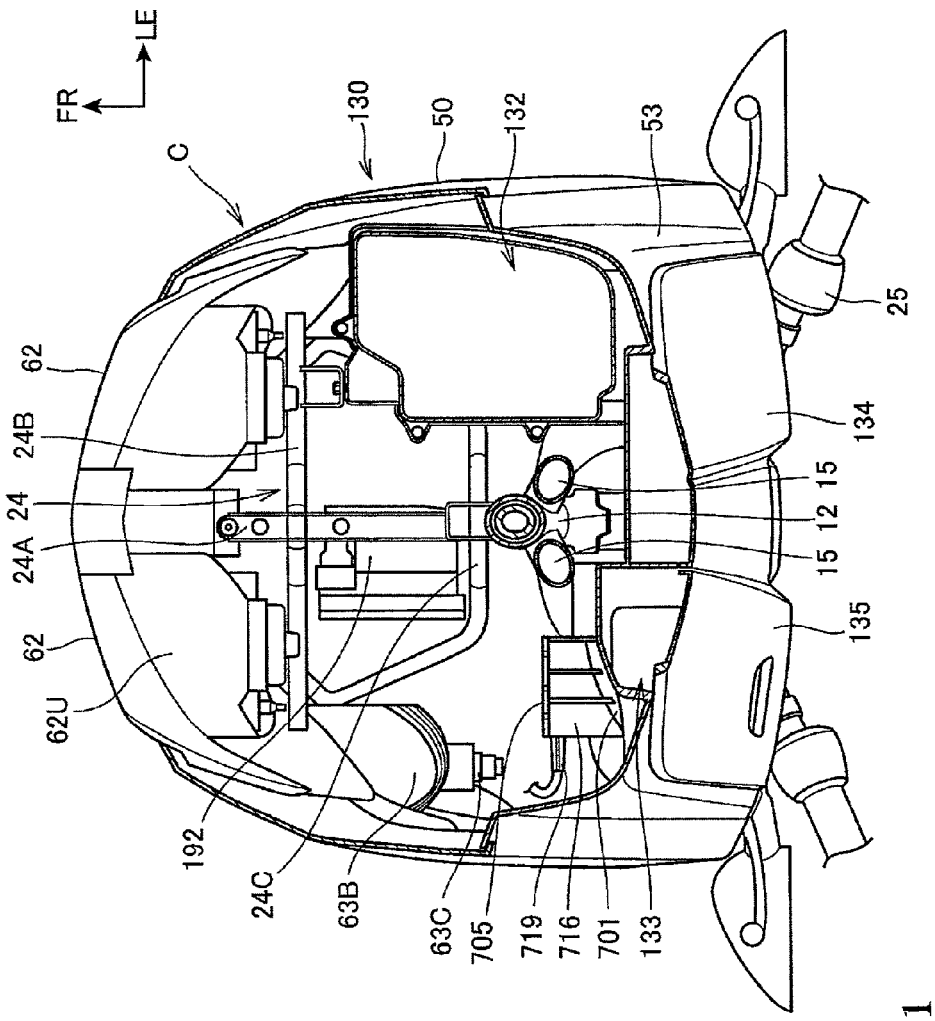
FIG. 11 is a cross-sectional view taken along line XI-XI of FIG. 10.

FIG. 11 is a cross-sectional view taken along line XI-XI of FIG. 10.

As shown in FIG. 10 and FIG. 11, a shielding wall 716 which extends forward substantially horizontally and which covers the burglary suppression device 705 from below is formed in the vicinity of the bottom wall 701 below the bulged wall portion 715. In the bottom view, since the shielding wall 716 has a front end extending to a position substantially overlapping with the front wall portion 707B of the burglary suppression device 705, and left and right ends extending to positions substantially overlapping with the left wall portion 707E and the right wall portion 707F, the whole lower wall portion 707D is substantially covered therewith. For this reason, the shielding wall 716 shields the water and/or dust intruding into the lower portion of the shielding wall 716, and the burglary suppression device 705 is prevented from being affected by the water and/or dust.

The connector portion 710 provided to the lower wall portion 707D of the burglary suppression device 705 is provided between the lower wall portion 707D and the shielding wall 716. The wiring 719 connected to the connector portion 710 is brought outside in the vehicle width direction from the portion between the lower wall portion 707D and the shielding wall 716. In this way, since the connector portion 710 is provided in a position sandwiched by the lower wall portion 707D and the shielding wall 716, it becomes difficult to access the connector portion 710 from the outside. Therefore, the connector portion 710 is prevented from being removed, and the burglary suppressing effect is improved. Also, after the wiring 719 is connected to the connector portion 710, the burglary suppression device 705 is set to the outer boss portion 712 and the inner boss portion 713, fastened from a forward side by the screws 709A, and attached. Therefore, even in such a structure that the connector portion 710 is provided between the lower wall portion 707D and the shielding wall 716, the shielding wall 716 does not become obstructive, and the burglary suppression device 705 is easily assembled.

As shown in FIG. 8, the burglary suppression device 705 is provided in the position overlapping with the ABS modulator 192 and the blinkers 63 in the height direction, the periphery of the burglary suppression device is surrounded with the head pipe 12, the ABS modulator 192, the blinkers 63, the right surface portion of the front cover 50, and the innermost wall 702, and further the burglary suppression device is covered with the upper cover 52 from above. Thereby, the alarm horn sound from the warming device 706 is less likely to be directly transmitted to the upper side and lateral side of the burglary suppression device 705. Meanwhile, the open portion 187 (FIG. 2) for arranging the front wheel 2 and the steering system 5 on the front surface of the foremost cover 130 as the front cowl is formed below the burglary suppression device 705, and the alarm horn sound from the alarm device 706 is reflected in the foremost cover 130 and concentrically emitted downwardly from the open portion 187. For this reason, the alarm horn sound from the alarm device 706 is efficiently transmitted to the outside.

Figure 12:
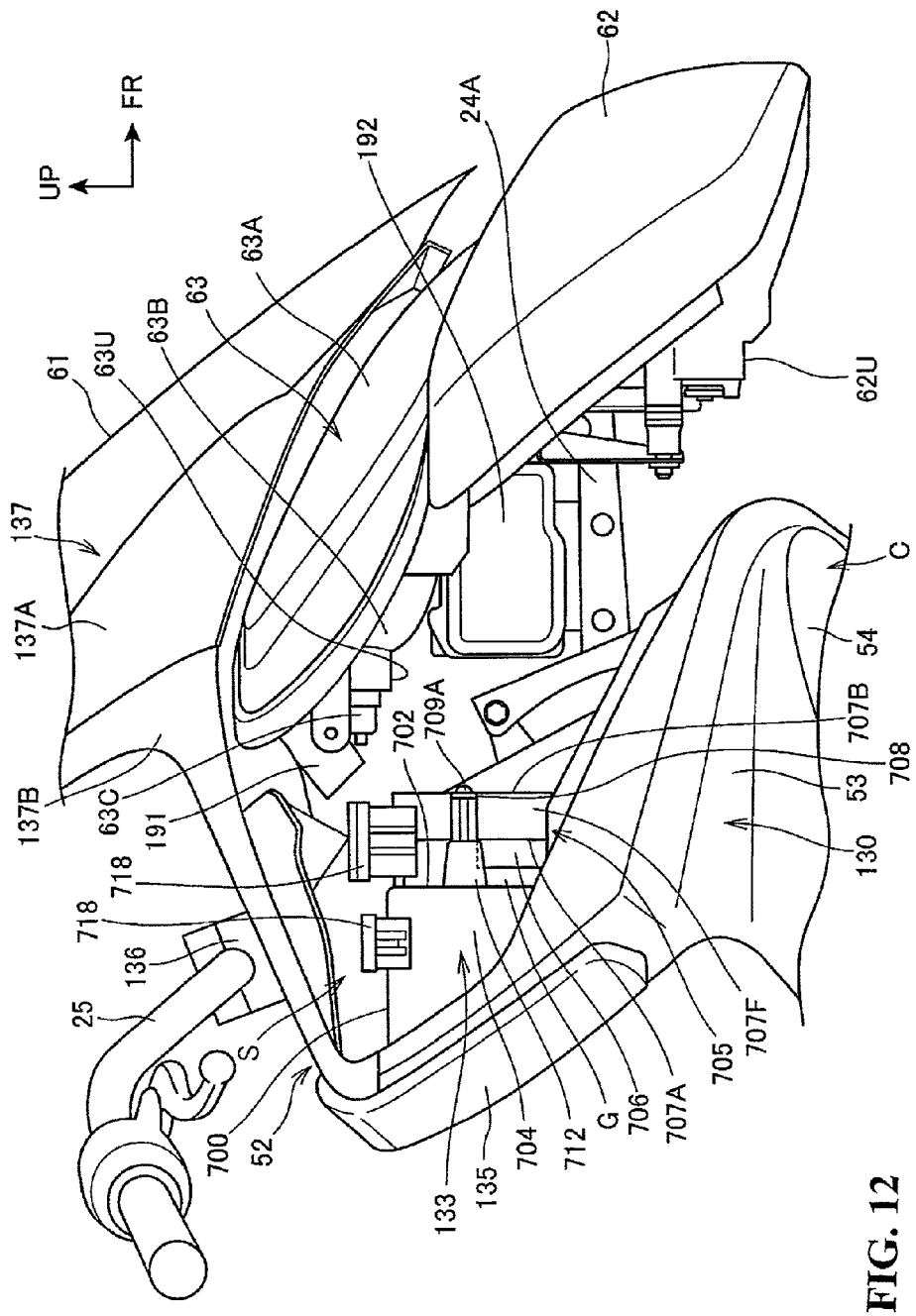
FIG. 12 is a right side view showing a front side of a vehicle with a front cover and an upper cover removed.

FIG. 12 is a right side view showing the front side of the vehicle with the front cover 50 and the upper cover 140 removed.

As shown in FIG. 7 and FIG. 12, the bulb 63C for the right blinker 63 is arranged forward of the burglary suppression device 705. Also, a fuse box 718 is arranged on the right side of the burglary suppression device 705. The bulb 63C and the fuse box 718 overlap with the burglary suppression device 705 in the height direction.

As shown in FIG. 12, with the upper cover 140 removed, the space S is exposed upwardly, and a worker easily performs maintenance of the bulb 63C and electric components such as the fuse box 718 through the space S. In FIG. 12, although the front cover 50 is removed, it is not necessary to remove the front cover 50 when performing the maintenance of the bulb 63C and the fuse box 718.

As described above, the burglary suppression device 705 is fixed on the innermost wall 702 of the goods storage portion 133 having the bottom wall 701, the innermost wall 702, the ceiling wall 700, the left sidewall 703 and the right sidewall 704 which form the storage space bulging inside of the foremost cover 130, and is arranged forward of the innermost wall 702. Therefore, the space S is provided above the goods storage portion 133, and extensibility of the space above the goods storage portion 133 is ensured. For this reason, the optional components such as the speaker are easily added.

Also, the shielding wall 716 extending forward from the innermost wall 702 is provided below the burglary suppression device 705. Therefore, even in such a structure that the burglary suppression device 705 is provided in front of the goods storage portion 133, the shielding wall 716 suppresses influences of water, dust or the like from below on the burglary suppression device 705.

Also, the connector portion 710 of the burglary suppression device 705, to which the wiring 719 is detachably connected, is provided between the burglary suppression device 705 and the shielding wall 716 below the burglary suppression device 705. Therefore, with the burglary suppression device 705 fixed, the connector portion 710 is less likely to be detached/attached from/to the wiring 719, and it becomes difficult to access the connector portion 710 from the outside. For this reason, the burglary suppressing effect is improved.

Further, the burglary suppression device 705 has the fastening portions 708, 708 having axes 709B extending in the longitudinal direction, and is fastened by the fastening portions 708, 708 to the outer boss portion 712 and the inner boss portion 713 which are provided to the innermost wall 702. Therefore, even if the connector portion 710 is connected to the burglary suppression device 705, the connector portion 710 does not become obstructive, and the burglary suppression device 705 is easily fastened through the fastening portions 708, 708 to the outer boss portion 712 and the inner boss portion 713 which are provided to the innermost wall 702.

Also, the burglary suppression device 705 has the alarm device 706, the burglary suppression device 705 is arranged with the clearance G between the opposed wall portion 707A of the burglary suppression device 705, opposed to the innermost wall 702, and the innermost wall 702, and the slits 711 for allowing the alarm horn sound from the alarm device 706 to pass through are formed on the side of the opposed wall portion 707A of the burglary suppression device 705. Therefore, the water, dust or the like is less likely to intrude into the slits 711, the water, dust or the like is prevented from intruding into the burglary suppression device 705, and also the alarm horn sound from the alarm device 706 is transmitted to the periphery by using the reflection of the sound emitted from the slits 711 and hitting on the innermost wall 702.

In addition, the upper cover 140 as the instrumental panel inclined downwardly to the rear side below the handlebar 25 is provided as a part of the foremost cover 130, the blinkers 63 are provided ahead of the upper cover 140 and ahead of the goods storage portion 133, the space S is exposed by removing the upper cover 140, and the maintenance of the bulbs 63C for the blinkers 63 is performed by using each space S above the storage portion. For this reason, excellent maintainability is achieved.

Further, the burglary suppression device 705 is arranged to be lateral to the head pipe 12 with the ABS modulator 192 being arranged in a position overlapping with the burglary suppression device 705 in the height direction, on the center of the vehicle in the vehicle width direction and ahead of the head pipe 12. The blinkers 63 are arranged in the positions overlapping with the burglary suppression device 705 in the height direction and ahead of the burglary suppression device 705. The open portion 187 is formed below the head pipe 12 so that the steering system 5 supported by the head pipe 12 is passed there through. Therefore, the alarm horn sound for the burglary suppression device 705 is echoed by the ABS modulator 192 and the blinkers 63 which are arranged around the burglary suppression device 705 in the position overlapping with the burglary suppression device 705 in the height direction, and also the alarm horn sound is efficiently transmitted to the periphery from the open portion 187 with the steering system 5 passed there through.

Subsequently, a leg shield structure for the motorcycle 1 will be described.

As shown in the above-mentioned FIG. 6, the upper inner cover 53 and the lower inner covers 54, 54 overhang toward the outside in the vehicle width direction beyond the seat 10 on the front side of the occupant RD (FIG. 1). In addition, overhang portions extend juncturally in the vertical direction without vertical clearance, thereby forming the leg shield 601 for covering the front sides of the feet of the occupant RD.

More specifically, the upper inner cover 53 composes the right and left upper leg shields 602 which cover the front sides around the knees of the occupant RD, the lower inner covers 54, 54 compose the lower leg shields 603 covering the front sides around the toes of the occupant RD, and the upper and lower leg shields 602, 603 form the large leg shield 601 for covering the front sides of the whole foot of the occupant over the upper and lower sides.

As shown in FIG. 6, in the motorcycle 1, a pair of right and left air discharge ports 641, 641 for releasing the flow of air from the front side of the vehicle body to the rear side is provided in the right and left side ends of the leg shield 601, and a pair of right and left air discharge ports 651, 651 for releasing the flow of air from the front side of the vehicle body to the rear side is also provided in the lateral center of the leg shield 601. The air discharge ports 641, 641 have a symmetrical shape. The air discharge ports 651, 651 also have a symmetrical shape.

Figure 13:
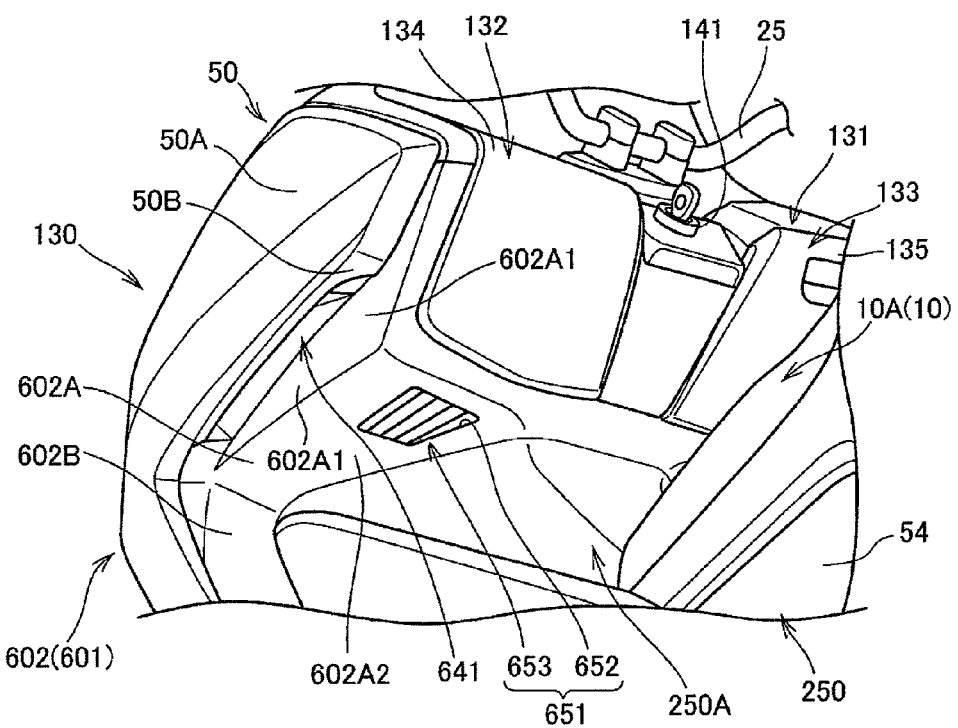
FIG. 13 is a perspective view showing an upper leg shield together with a peripheral structure.
Figure 14:
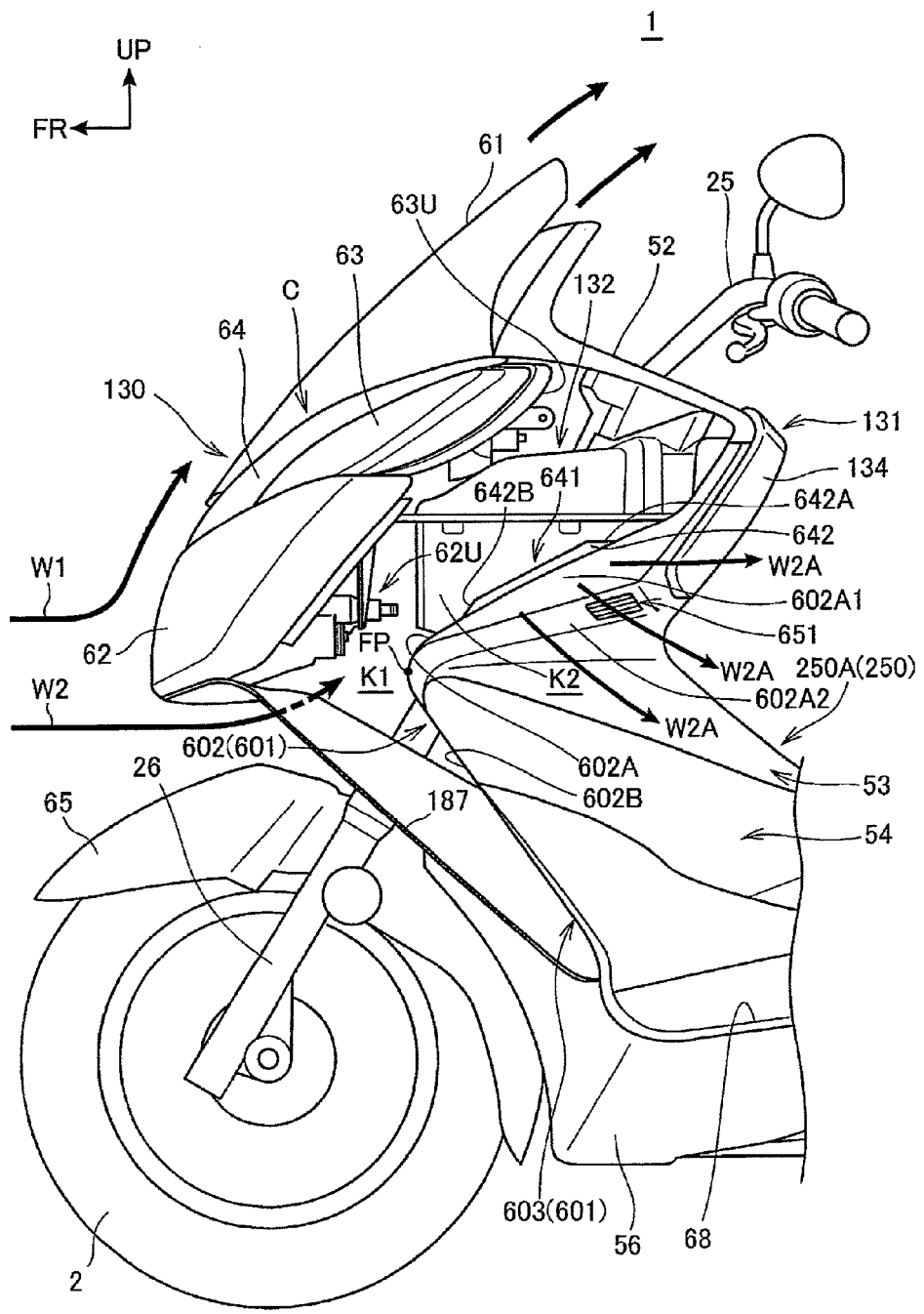
FIG. 14 is a view showing the front side of the vehicle body when viewed from a left side with the front cover removed.
Figure 15:
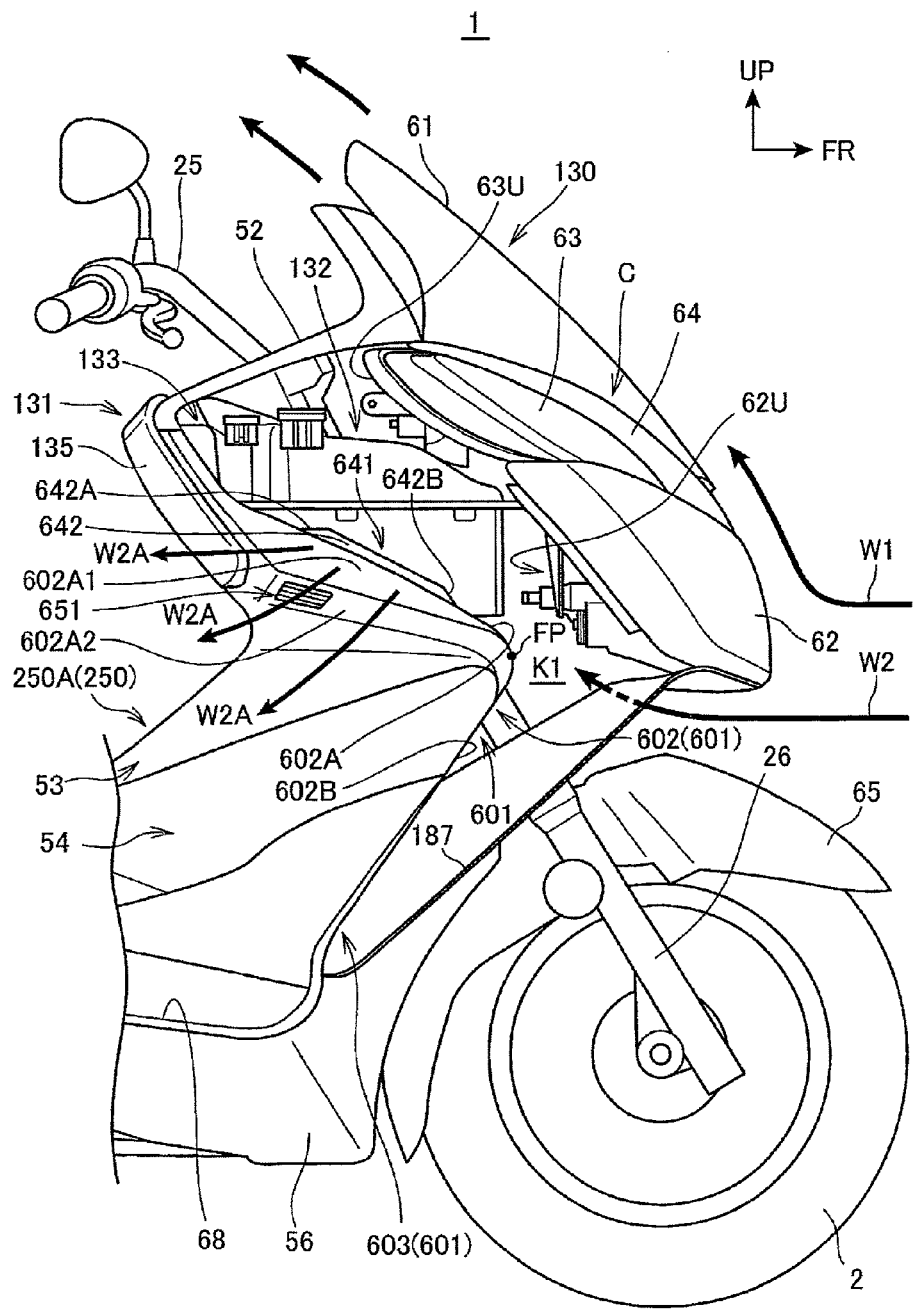
FIG. 15 is a view showing the front side of the vehicle body when viewed from a right side with the front cover removed.

FIG. 13 is a perspective view showing the upper leg shield 602 together with the peripheral structure, when viewed obliquely from below, FIG. 14 is a view showing the front side of the vehicle body when viewed from the left side, and FIG. 15 is a view showing the front side of the vehicle body when viewed from the right side. Note that in FIG. 14 and FIG. 15, the front cover 50 is omitted.

As shown in FIG. 13, the upper leg shield 602 is formed into a V-shaped cover spreading in the vertical direction toward the rear side in the side view. More specifically, the upper leg shield 602 integrally has upper side portions 602A extending upwardly to the rear from the front ends FP (FIG. 14, FIG. 15), and lower side portions 602B extending downwardly to the rear from the front ends. The upper side portion 602A is integrally provided with lateral covering portions 602A1 extending in the longitudinal direction in order to cover the front storage box 131 provided on the front side of the vehicle body from the outside in the vehicle width direction, and bottom covering portions 602A2 extending in the longitudinal direction in order to cover the front storage box 131 from below. Thereby, the upper side portion 602A is formed as a cover for covering the lateral side and lower side of the front storage box 131.

As shown in FIG. 13 to FIG. 15, the lower side portion 602B and the lower leg shield 603 are formed into shapes extending downwardly to the rear in tabular section extending in the vehicle width direction. Floor mats (not shown) are placed on upper surfaces of the extended shapes with right and left step floors 68 (FIG. 1) being formed by the extended shapes.

As shown in FIG. 14 and FIG. 15, right and left air guide passages K1, K1 (equivalent to the upper portion of the open portion 187 (FIG. 2)) for introducing the flow of air from the front side of the vehicle body (in drawings, flows of the flow of air are shown by arrows W1, W2) toward the upper inner cover 53 from below the front cover 50 are opened between the front cover 50 and the upper inner cover 53. Since the rear surfaces of lamp units 62U for the head lights 62 and lamp units 63U for the blinkers are formed into a shape directed upwardly to the rear side, the right and left air guide passages K1, K1 are efficiently largely ensured.

Figure 16:
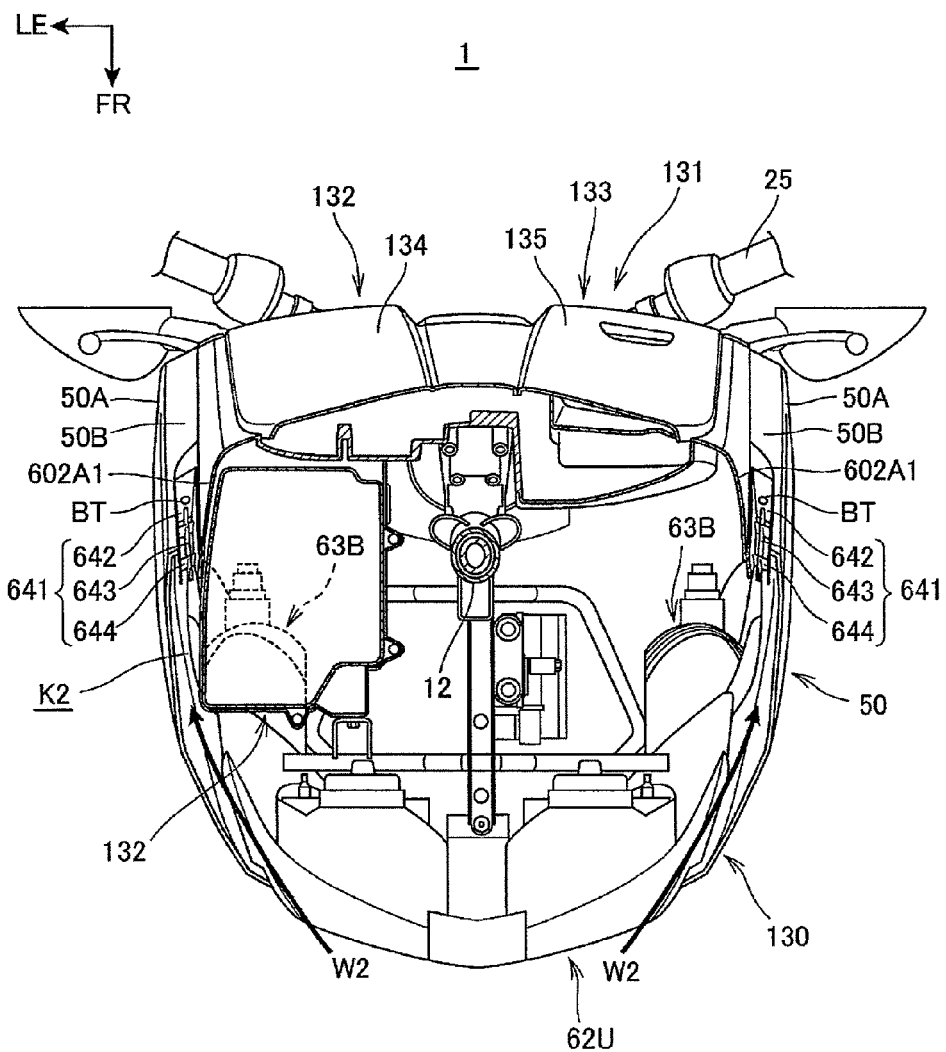
FIG. 16 is a cross-sectional view taken along line XVI-XVI of FIG. 6.

FIG. 16 is a cross-sectional view taken along line XVI-XVI of FIG. 6.

As shown in FIG. 16, the left goods storage portion 132 is formed as a large storage box extending forward to the vicinity of the back surface of the lamp unit 62U of the head light 62, and a front half portion thereof extends toward the outside in the vehicle width direction beyond the front cover 50. For this reason, the left goods storage portion 132 projects forward of the front cover 50, and forms an air guide passage K2 forming a part of the left air guide passage K1 in the forward of the front cover 50.

In the structure, as shown in FIG. 16, the air discharge ports 641, 641 for releasing the flow of air from the front side of the vehicle body to the rear, the flow of air introduced to the air guide passages K1 and K2, are formed in the side ends as the outer ends of the upper side portions 602A of the upper leg shields 602 in the vehicle width direction. The air discharge ports 641, 641 are integrally provided with vertically long frames 642, 642 provided at the upper edges of the upper side portions 602A, 602A and extending upwardly to the rear, a single vertical fin 643, 643 extending over the vertical direction in the frames 642, 642, and a plurality of lateral fins 644, 644 extending over the horizontal direction in the frames 642, 642.

As shown in FIG. 14 and FIG. 15, the air discharge ports 641, 641 are integrally formed with the upper inner cover 53, provided along the upper edges of the upper side portions 602A, 602A, and opened rearwardly and downwardly. The lateral fins 644, 644 are also set rearwardly and downwardly. Thereby, the flow of air introduced to the air discharge ports 641, 641 is guided rearwardly and downwardly.

The lateral fins 644, 644 are set rearwardly and downwardly. Thereby, when the occupant RD (FIG. 1) positioned obliquely upwardly of the air discharge ports 641, 641 takes a look at the air discharge ports 641, 641, the line of sight of the occupant is shielded by the lateral fins 644, 644, and the opening of each of the air discharge ports 641, 641 is less likely to be viewed from the occupant RD.

Further, by providing the vertical fins 643, 643, the flow of air W2A passing through the air discharge ports 641, 641 is straightened in an optional direction in the vehicle width direction, and also when the occupant RD or the like getting out of the motorcycle 1 takes a look at the air discharge ports 641, 641 from the outside of the vehicle, the line of sight of the occupant is shielded by the vertical fins 643, 643, and the opening of each of the air discharge ports 641, 641 is less likely to be viewed.

Note that the lateral fins 644, 644 are not limited to be set rearwardly and downwardly, and may be directed horizontally or the like since it is possible to prevent the lateral fins from being viewed by the occupant RD or the like unless the lateral fins are set rearwardly and upwardly, that is, directed to the occupant RD.

As shown in FIG. 14 and FIG. 15, the frames 642, 642 of the air discharge ports 641, 641 are positioned above the open portion 187 with the front wheel 2 arranged therein and the steering system 5 passed therethrough, and is formed into a frame shape projecting forwardly and upwardly from the upper side portions 602A, 602A in the side view. Upper plates 642A composing the uppermost portions of the frames 642, 642 are formed into a horizontal plate extending substantially horizontally in the longitudinal direction, and lower plates 642B composing the lowermost portions of the frames 642, 642 are formed into a forwardly downward plate extending forwardly and downwardly.

As shown in FIG. 13, only when the air discharge ports 641, 641 are viewed obliquely from below, both the upper plates 642A and the lower plates 642B are viewable. In positions other than that, for example, from the occupant RD (see FIG. 1) seated on the seat 10, the upper plates 642A and the lower plates 642B are not viewable.

The upper plates 642A and the lower plates 642B are respectively provided with fastening portions (bolt fastening portions in the structure) BT, BT for fastening the upper inner cover 53 having the air discharge ports 641, 641 and the front cover 50 fixed in the forward direction of the upper inner cover 53. Herewith, by using the air discharge ports 641, 641, the upper inner cover 53 and the front cover 50 are fastened in the position hardly viewed from the occupant RD seated on the seat 10.

Further, as shown in FIG. 13 or the like, the right and left air discharge ports 641, 641 are covered from the outside in the vehicle width direction with right and left wall portions 50A, 50A of the front cover 50. The right and left wall portions 50A, 50A of the front cover 50 have rear walls 50B, 50B having a predetermined width in the vehicle width direction. The rear walls 50B, 50B have relief portions for avoiding the right and left air discharge ports 641, 641, thereby achieving layout of the right and left air discharge ports 641, 641 in the rear walls 50B, 50B.

In this way, as shown in the above-mentioned FIG. 8, the pair of right and left air discharge ports 641, 641 is formed to have an appearance buried in the front cover 50.

Next, the pair of right and left air discharge ports 651, 651 provided in the lateral center of the leg shield 601 will be described.

Figure 17:
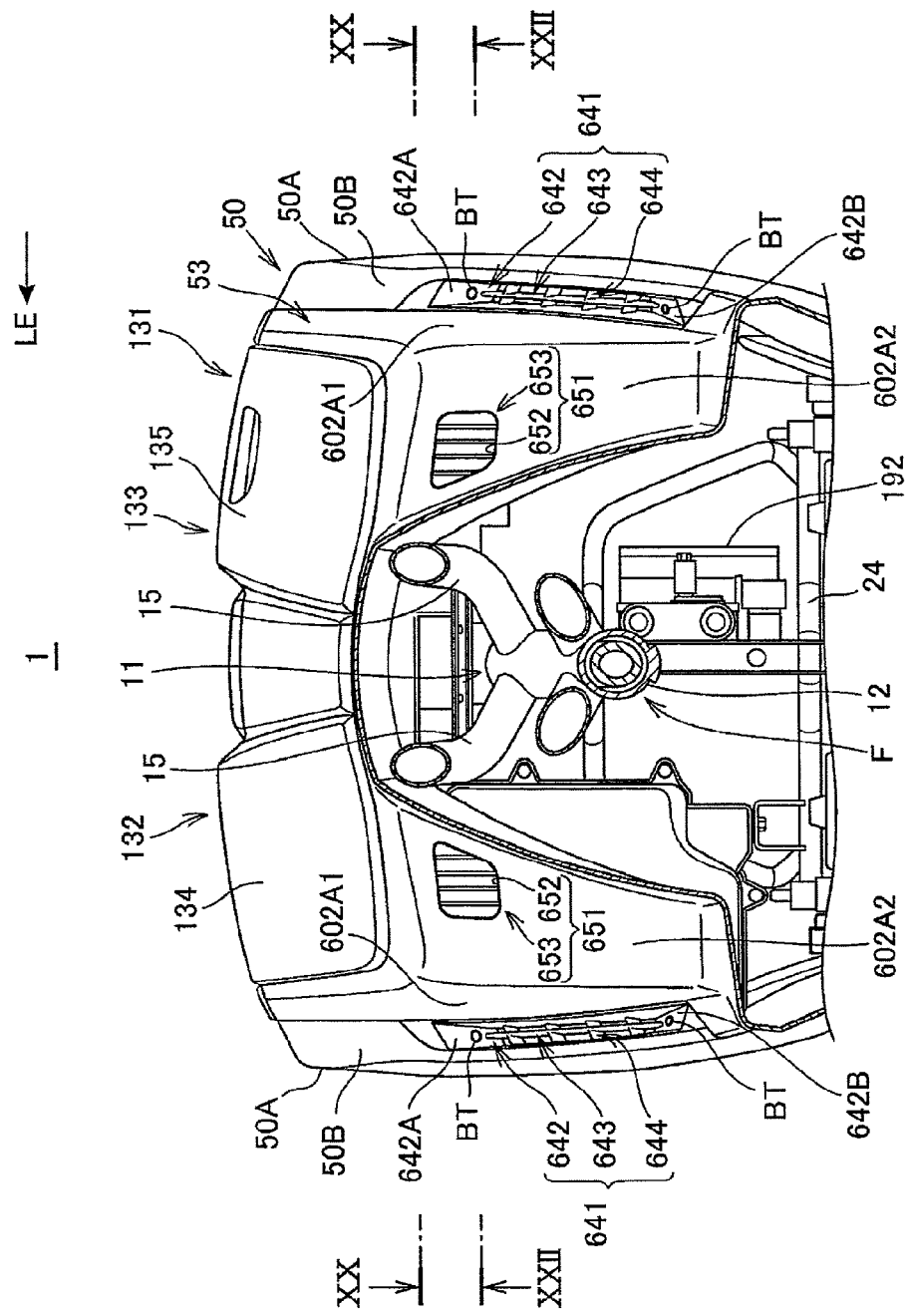
FIG. 17 is a view showing air discharge ports when viewed from below together with a peripheral structure.
Figure 18:
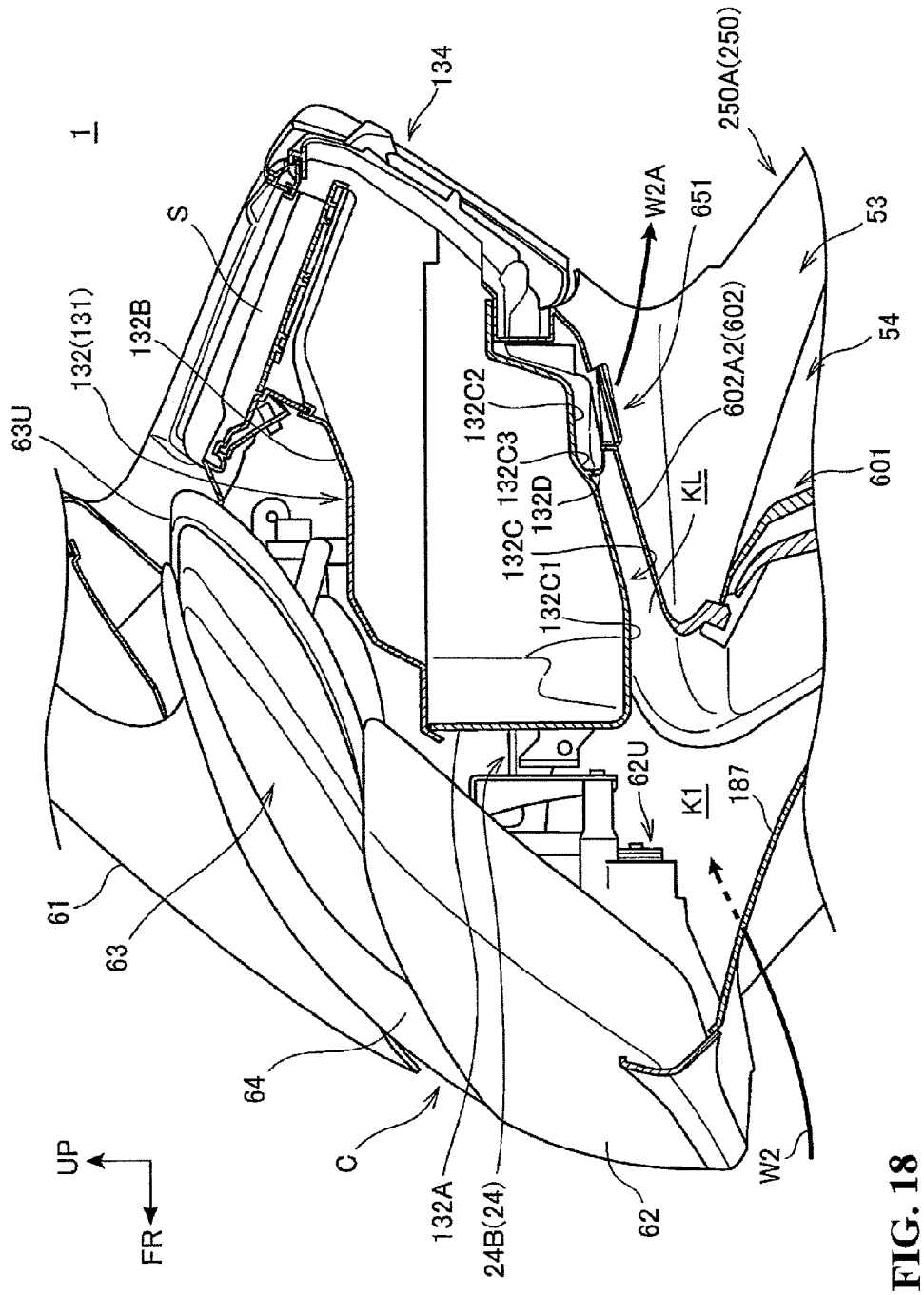
FIG. 18 is a sectional side view showing a left air discharge port together with a peripheral structure.
Figure 19:
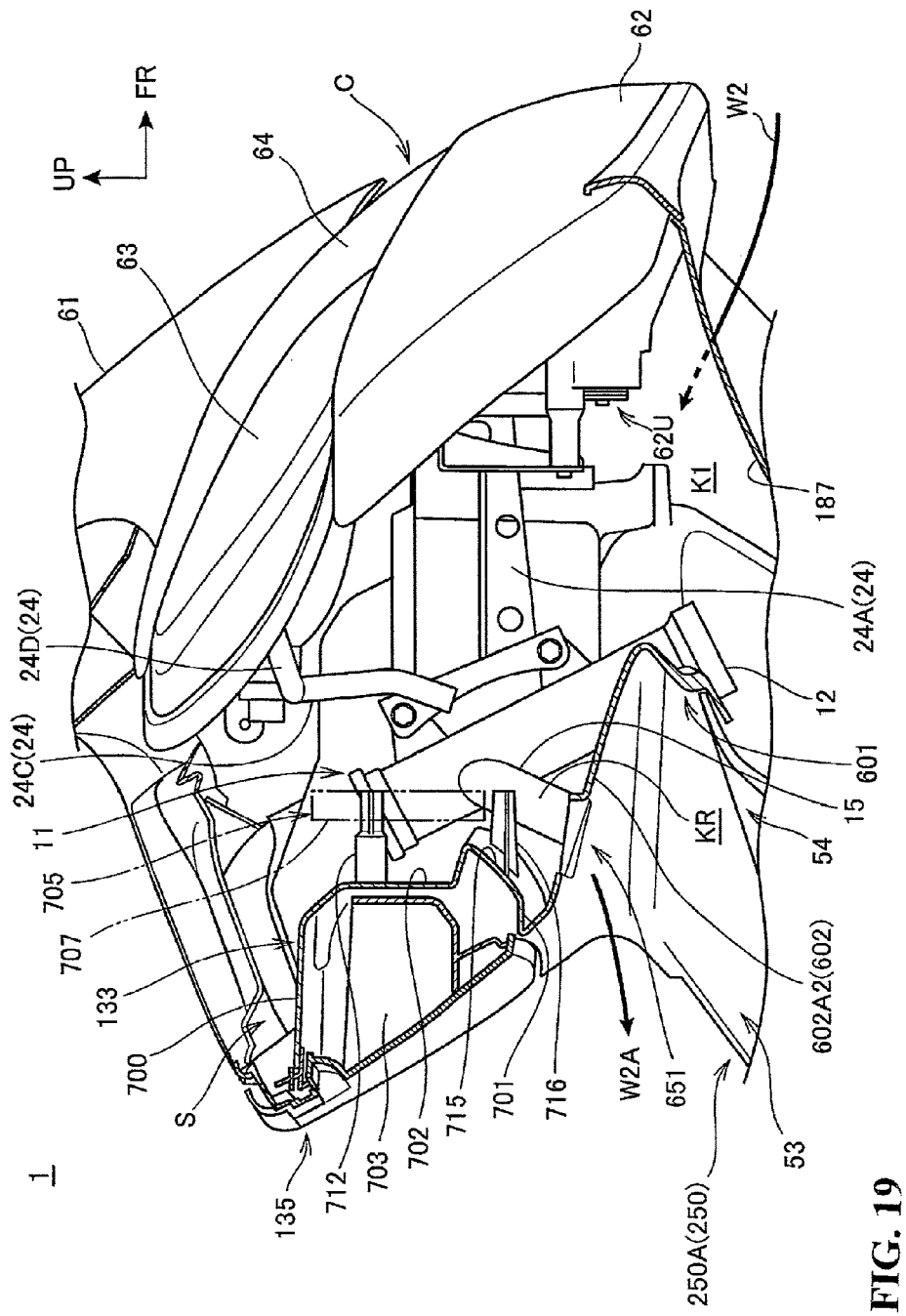
FIG. 19 is a sectional side view showing a right air discharge port together with a peripheral structure.

FIG. 17 is a view showing the air discharge ports 651, 651 when viewed from below together with the peripheral structure, FIG. 18 is a sectional side view showing the left air discharge port 651 together with the peripheral structure, and FIG. 19 is a sectional side view showing the right air discharge port 651 together with the peripheral structure.

As shown in FIG. 17, the air discharge ports 651, 651 are provided in the bottom covering portions 602A2 of the upper leg shields 602. More specifically, the air discharge ports 651, 651 are integrally provided with the substantially rectangular frames 652, 652 opened along the tabular bottom covering portions 602A2 inclined upwardly to the rear in the side view of the vehicle body, and a plurality of vertical fins 653, 653 extending over the longitudinal direction at intervals in the horizontal direction in the frames 652, 652.

For this reason, the air discharge ports 651, 651 are formed into the openings passed in the vertical direction of the vehicle body, downwardly guide the flow of air introduced from the front side of the vehicle body to the air discharge ports 651, 651, and is configured such that the openings of the air discharge ports 651, 651 are less likely to be viewed from the occupant RD.

In this way, since the air discharge ports 651, 651 are provided in the lateral center of the leg shield 601, the flow of air from the front side of the vehicle body is supplied to the lateral center of the leg shield 601, and a vacuum in the lateral center thereof is reduced. Also, since the air discharge ports 651, 651 are formed into the openings passed in the vertical direction of the vehicle body, the flow of air from the front side of the vehicle body is not directly released from the air discharge ports 651, and is discharged from the air discharge ports 651 after downwardly changing the direction of the flow of air. For this reason, the flow of air is easily discharged from the air discharge ports 651. In addition, dust, rainwater or the like entering together with the flow of air is less likely to be passed through the air discharge ports 651.

Also, since the vertical fins 653, 653 are provided, the flow of air W2A passed through the air discharge ports 651, 651 is straightened in the optional direction in the vehicle width direction, and also the openings of the air discharge ports 651, 651 are less likely viewed by shielding the line of sight of the occupant RD or the like by the vertical fins 653, 653 when the air discharge ports 651, 651 are viewed from the outside of the vehicle by the occupant RD or the like getting out of the motorcycle 1.

More specifically, as shown in FIG. 18 and FIG. 19, the frames 652, 652 of the air discharge ports 651, 651 are provided above the open portion 187 for arranging the front wheel 2, provided on the front upper side of the center tunnel portion 250 in the side view, and is formed into a frame shape inclined upwardly to the rear at a substantially horizontal angle.

Figure 20:
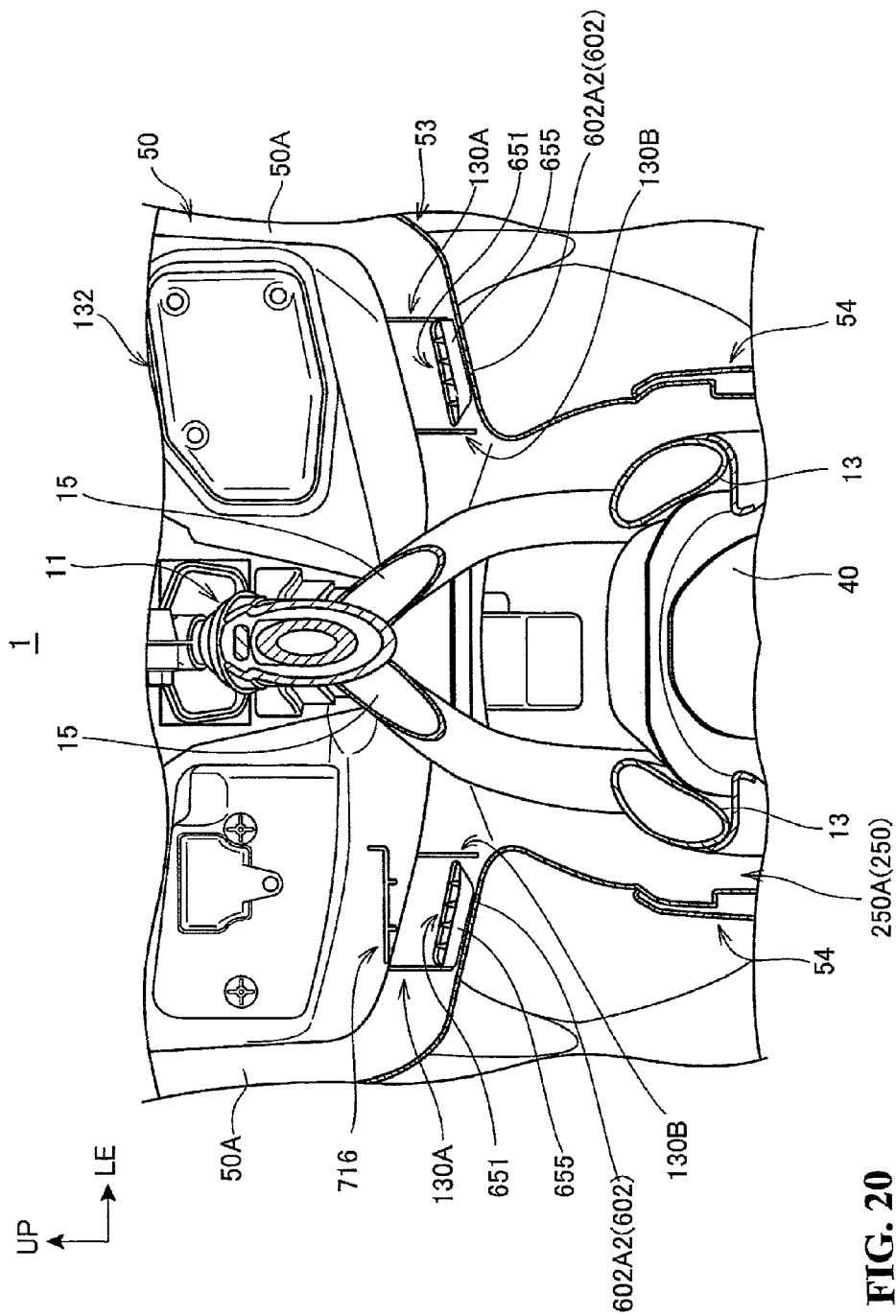
FIG. 20 is a cross-sectional view taken along line XX-XX of FIG. 17.
Figure 21:
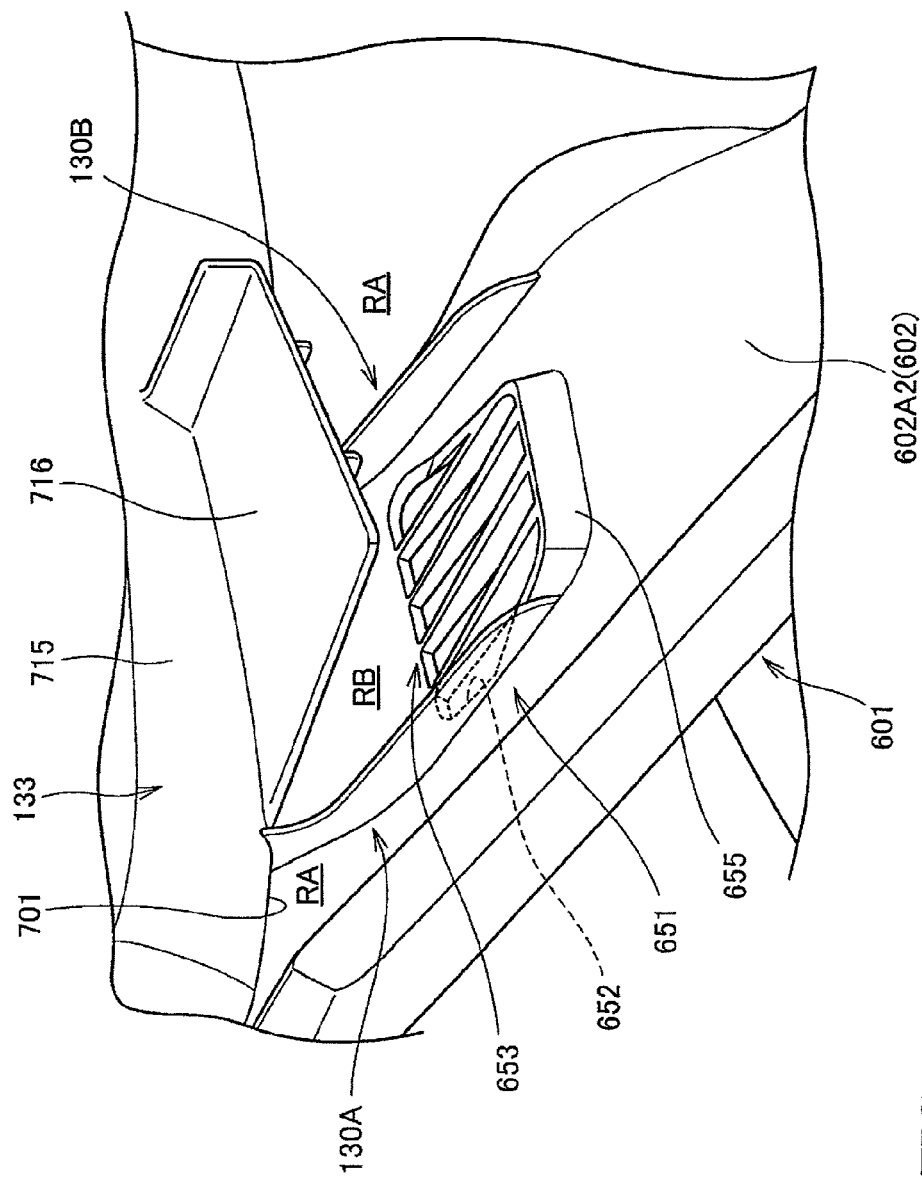
FIG. 21 is a view showing the air discharge port when viewed from an inner side of a foremost cover.

FIG. 20 is a view showing a cross-sectional surface just before the air discharge ports 651, 651 when viewed from the front side of the vehicle body (the cross-sectional view taken along line XX-XX of FIG. 17), and FIG. 21 is a view showing the air discharge port 651 when viewed from the inner side of the foremost cover 130. As shown in the drawing, the air discharge port 651 is provided integrally with a rib wall 655 disposed upright toward the upper side at the inner front edge of the frame 652. By providing the rib wall 655, the rigidity of a boundary between the foremost cover 130 and the air discharge port 651 is improved. In addition, the intrusion of dust, rainwater or the like from the front side of the vehicle body is suppressed.

In addition, the foremost cover 130 is provided integrally with a pair of left and right vertical ribs 130A, 130B extending in the longitudinal direction on the right and left sides of the air discharge port 651. The pair of left and right vertical ribs 130A, 130B is a wall extending in the longitudinal direction along an inclination of the foremost cover 130 and rising on the right and left sides of the air discharge port 651. More specifically, the pair of right and left vertical ribs extends rearwardly from the right and left sides in a position at the front end as the lowest position of the air discharge port 651 and extends to positions higher than the air discharge port 651. For this reason, when dust, rainwater or the like from the outside is led to flow into a region RA behind the foremost cover 130, the left and right vertical ribs 130A, 130B function as guides for discharging the dust, rainwater or the like to the outside of the foremost cover 130 along the inclined surface of the foremost cover 130 while avoiding an inflow into the air discharge port 651 (in FIG. 21, inflow into a region RB). Also, it is possible to suppress the intrusion of dust, rainwater or the like from the air discharge port 651 into the foremost cover 130. Further, by providing the vertical ribs 130A, 130B, the rigidity of the cover around the air discharge port 651 is also improved.

Figure 22:
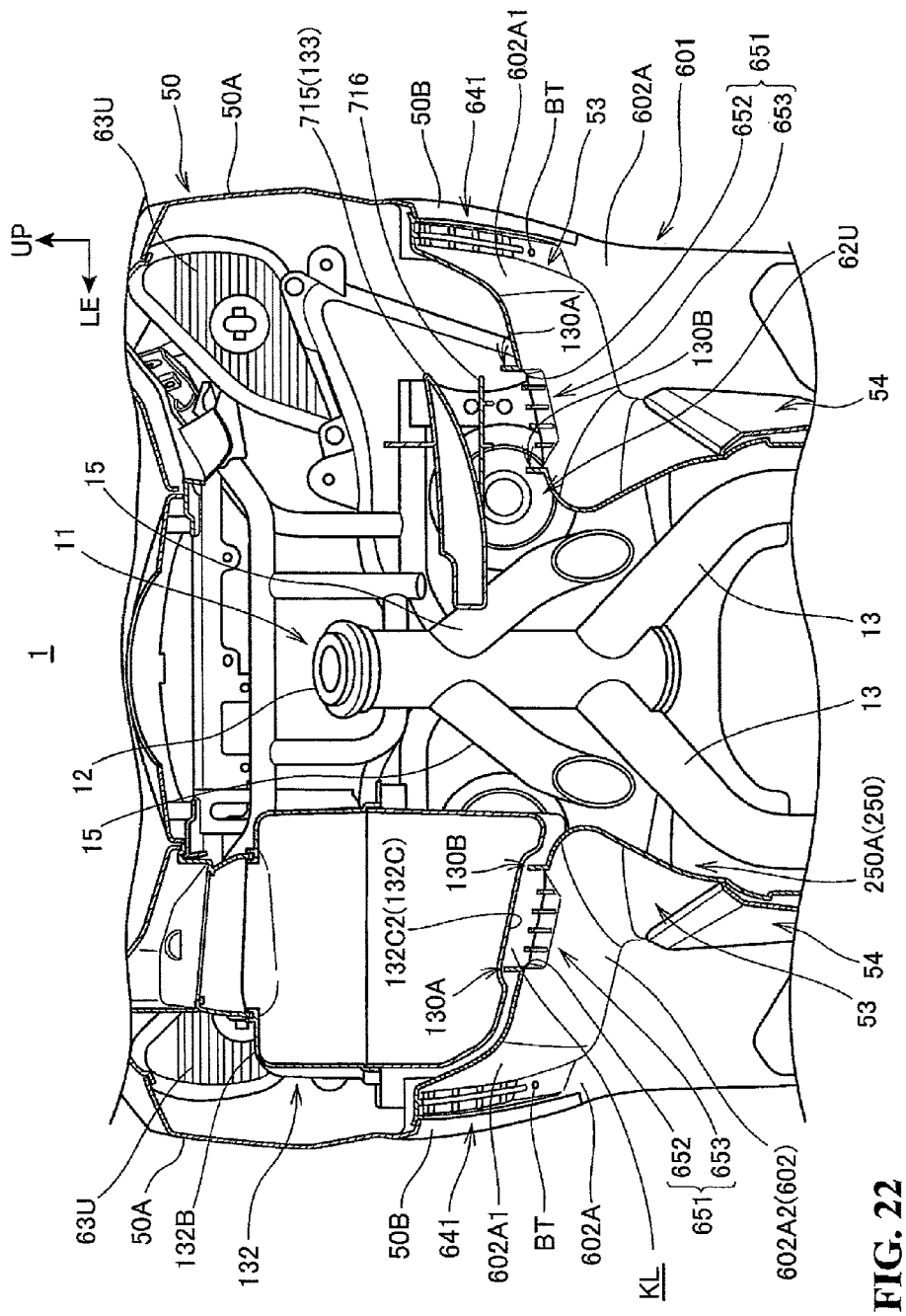
FIG. 22 is a cross-sectional view taken along line XXII-XXII of FIG. 17.

FIG. 22 is a cross-sectional view taken along line XXII-XXII of FIG. 17.

As shown in FIG. 18 and FIG. 22, the large goods storage portion 132 long in the longitudinal direction, of the left and right goods storage portions 132, 133, is arranged above the left air discharge port 651. For this reason, on the left side of the vehicle body, a part of the flow of air W2 from the front side of the vehicle body is passed through a clearance KL between the goods storage portion 132 and the bottom covering portion 602A2 of the upper leg shield 602, and is allowed to flow to the left air discharge port 651.

In the side view of the vehicle body (see FIG. 18), with the vicinity of the front side of the air discharge port 651 as the boundary, the bottom wall 132C of the goods storage portion 132 has a front side formed as a deepest bottom wall 132C1 lower than the air discharge port 651, and a rear side formed as a raised bottom wall 132C2 higher than the air discharge port 651, and is formed integrally with a vertical wall 132C3 extending in the vertical direction in order to connect a stepped portion between the deepest bottom wall 132C1 and the raised bottom wall 132C2. For this reason, the clearance KL is formed into a clearance narrow in the vertical direction, and also formed as a bent passage bent not only in the longitudinal direction of the vehicle body but also in the vertical direction, thereby forming the labyrinth passage for the flow of air.

Further, the bottom wall 132C of the goods storage portion 132 is formed integrally with a rib wall 132D projecting downwardly in the clearance KL. Thereby, the strength of the bottom wall 132C is increased by the rib wall 132D, and also the clearance KL is formed as a more complicated labyrinth passage.

Figure 23:
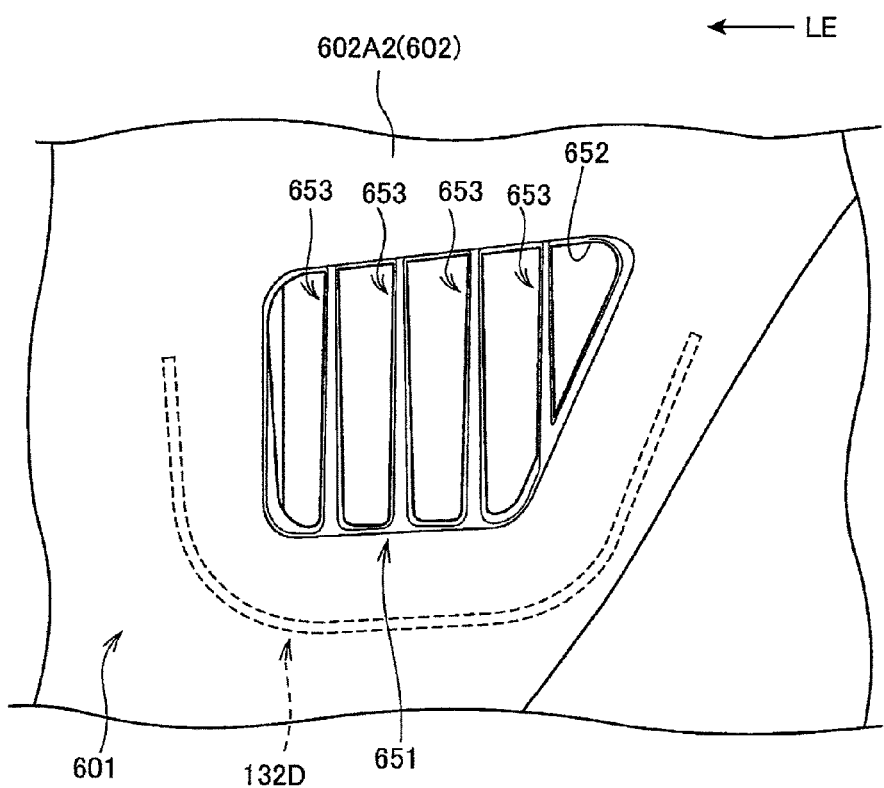
FIG. 23 is a view showing the left air discharge port when viewed from below.
Figure 24:
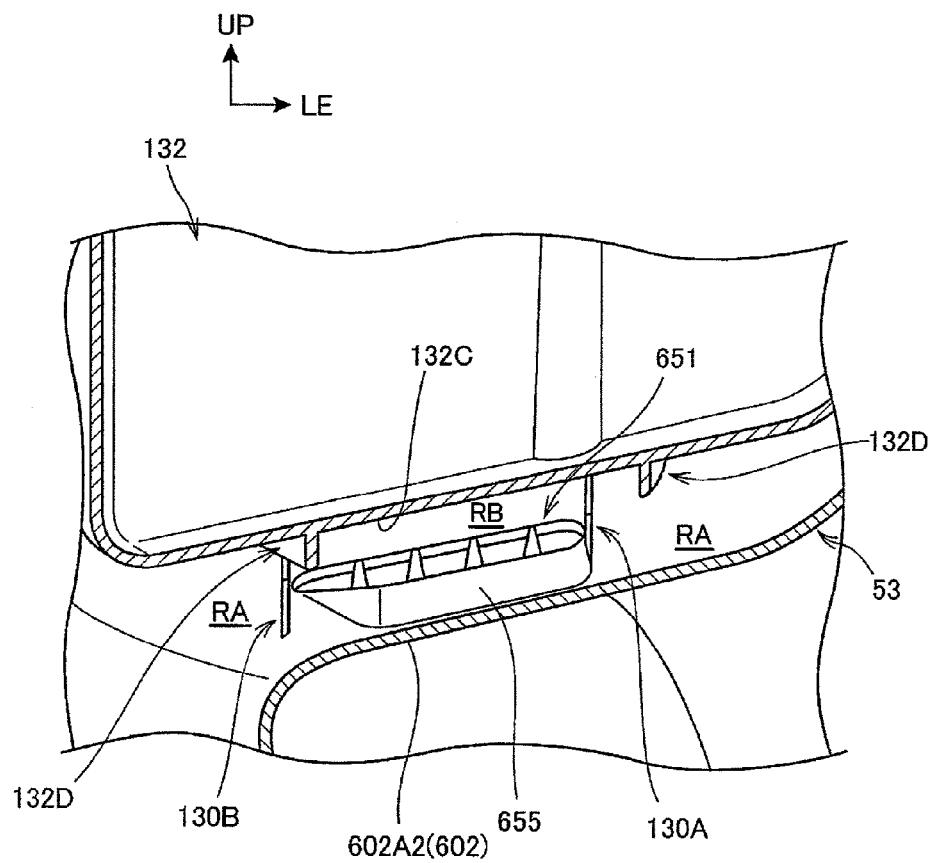
FIG. 24 is a cross-sectional view showing the left air discharge port when viewed from the front.

FIG. 23 is a view showing the left air discharge port 651 when viewed from below, and FIG. 24 is a cross-sectional view showing the left air discharge port 651 when viewed from the front. As shown in the drawings, the rib wall 132D is formed into a U-shaped rib opened rearwardly in the bottom view of the vehicle body and extending to surround the front edge and the right and left side edges of the left air discharge port 651. Thereby, the clearance KL is narrowed in the vertical direction on the front, right and left sides of the air discharge port 651, and the clearance KL is formed as the labyrinth passage bent in the vertical direction toward the air discharge port 651 in any of the longitudinal direction and the horizontal direction.

For this reason, the flow of air W2 from the front side of the vehicle body is passed through the left air discharge port 651 after being passed through the clearance KL as the labyrinth passage. Therefore, dust, rainwater or the like entering together with the flow of air W2 (W2A) is less likely to be passed through by the labyrinth passage, a flow rate of the flow of air W2A is reduced, and the flow of air is sent to the side of the occupant RD with an appropriate air volume.

Also, the bottom wall 132C of the goods storage portion 132 is recessed upwardly projectingly above the air discharge port 651, and sections an air guide passage guiding the flow of air to the left air discharge port 651, in the back view of the vehicle body (see FIG. 22). In this case, since the vertical length of the clearance KL is ensured, the flow of air enough to reduce the vacuum is led to flow to the air discharge port 651. In addition, since the right and left sides of the clearance KL are narrow, dust, rainwater or the like is less likely to enter from the right and left sides.

In this structure, since the upper side of the left air discharge port 651 is covered with the goods storage portion 132, even if the water enters from the left air discharge port 651 into the inside in case of rain or in washing the vehicle, the water is blocked by the goods storage portion 132, thereby suppressing the entering of the water into the foremost cover 130 such as the front cowl.

As shown in FIG. 19, FIG. 21 and FIG. 22, the shielding wall 716 projecting forward from the innermost wall of the right goods storage portion 133 is arranged above the right air discharge port 651. For this reason, on the right side of the vehicle body, a part of the flow of air W2 from the front side of the vehicle body is passed through the clearance KR between the shielding wall 716 and the bottom covering portion 602A2 of the upper leg shield 602 and is led to flow to the right air discharge port 651.

In this case, since the shielding wall 716 is arranged above the right air discharge port 651, even if water enters from the right air discharge port 651 into the inside in the case of rain or in washing the vehicle, the water is blocked by the shielding wall 716.

Figure 25:
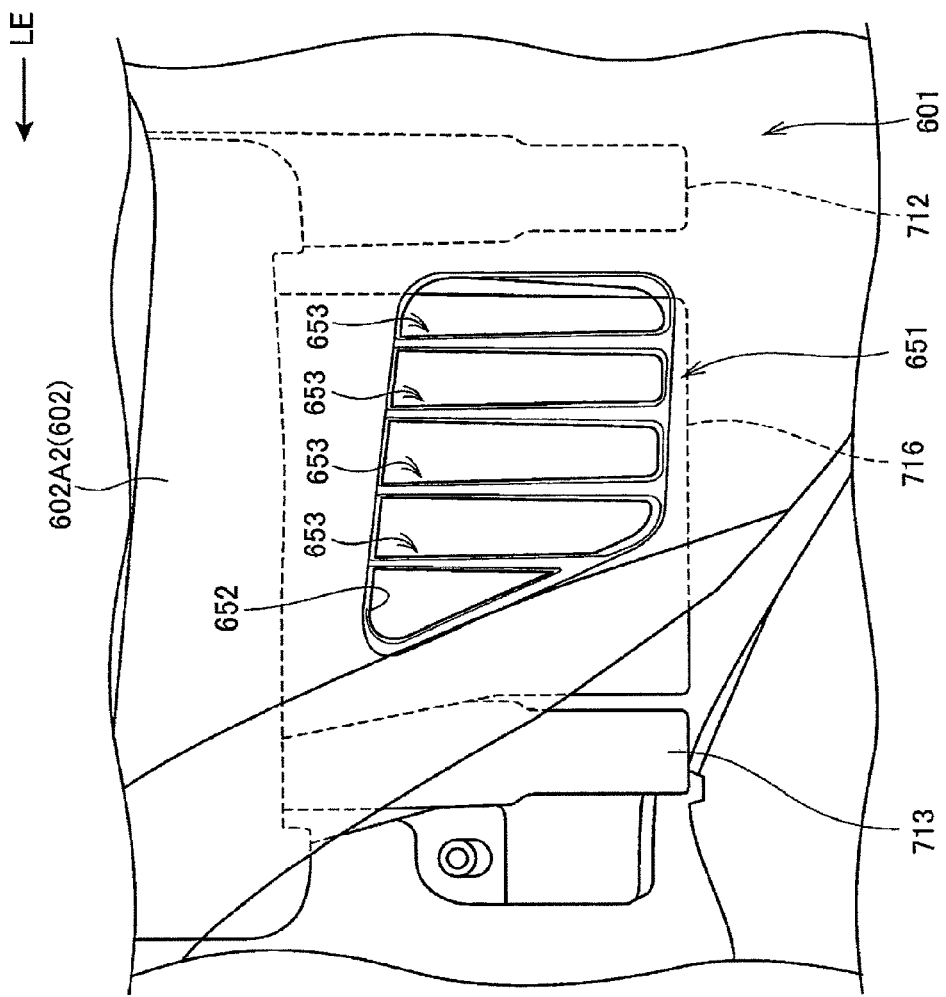
FIG. 25 is a view showing the right air discharge port when viewed from below.

FIG. 25 is a view showing the right air discharge port 651 when viewed from below. As shown in FIG. 22 and FIG. 25, the shielding wall 716 extends closer to the lateral center side than the right air discharge port 651. In other words, the shielding wall is arranged offset on the center side of the vehicle width with respect to the right air discharge port 651. For this reason, even if water enters from the right air discharge port 651 into the inside in the case of rain or in washing the vehicle, the water is certainly prevented from intruding into the portions above the right air discharge port and into the center side of the vehicle width. As described above, on the center side of the vehicle width, a number of components such as a meter unit 191 are arranged, so that the water is effectively prevented from adhering to the components. Also, since the shielding wall 716 does not extend outward in the vehicle width direction beyond the right air discharge port 651, it is enough that the shielding wall 716 is compact, and the layout for the other components is performed by using a dead space between the shielding wall 716 and the foremost cover 130.

Next, action of an air guide structure will be described.

As shown in FIG. 14 and FIG. 15, the flow of air W1 (FIG. 14, FIG. 15) directed to the front cover 50 during traveling of the motorcycle 1 is led to flow rearwardly and upwardly along the front surfaces of the front cover 50 and windscreen 61. At this time, since a part of the flow of air W1 is introduced also to the back side of the windscreen 61, the vacuum generated behind the windscreen 61 is reduced. Thus, the upper half of the body of the occupant RD positioned behind the windscreen 61 is less likely to be affected by the vacuum. In addition, a comfortable ride is achieved during operation of the vehicle by receiving a moderate flow of air.

In addition, the flow of air W2 flowing below the front cover 50 is led to flow into the right and left air guide passages K1, K1 (equivalent to the upper portion of the open portion 187 (FIG. 2)) formed between the upper inner cover 53 and the lamp unit 62U provided on the front lower side of the front cover 50, and a part of the flow of air is passed through the air guide passage K2 (FIG. 14, FIG. 16) formed between the goods storage portion 133 and the front cover 50 and discharged rearwardly from the air discharge ports 641, 641 formed in the right and left side ends of the upper inner cover 53.

The flow of air is discharged rearwardly from the air discharge ports 641, 641. Thus, the entrainment of the flow of air flowing on the right and left sides of the motorcycle 1 to the inside in the vehicle width direction (on the side of the occupant) is suppressed, and the vacuum state in the space for the occupant RD is suppressed.

As shown in the above-mentioned FIG. 14 and FIG. 15, in the structure, the lateral covering portions 602A1, 602A1 extending in the longitudinal direction in order to cover the front storage box 131 from the outside in the vehicle width direction are provided inside in the vehicle width direction of the right and left air discharge ports 641, 641. For this reason, the flow of air discharged from the air discharge ports 641, 641 is smoothly guided rearwardly along the right and left lateral covering portions 602A1, 602A1.

More specifically, the right and left lateral covering portions 602A1, 602A1 function as discharged air guide portions for guiding the flow of air discharged from the right and left air discharge ports 641, 641 to the rear side. Thereby, an area for preventing the entrainment of the flow of air flowing on the right and left sides of the motorcycle 1 is enlarged rearwardly.

Also, as shown in the above-mentioned FIG. 16, the lateral covering portions 602A1, 602A1 are formed on surfaces corresponding to the inner sides in the vehicle width direction as they are directed to the rear side. For this reason, it is possible to introduce discharged air to the lateral center side and to reduce the vacuum in the vicinity of the center.

Further, in this structure, since the rear side of each of the air discharge ports 641, 641 is formed in the space directed rearwardly and downwardly by the upper leg shield 602 and the lower leg shield 603, the flow of air discharged from the air discharge ports 641, 641 is also led to flow rearwardly and downwardly. More specifically, the flow of air is extensively led to flow rearwardly and downwardly. Thereby, the area for preventing the entrainment of the flow of air is enlarged in the vertical direction, and the windshield effect is achieved in a wide range, with respect to the lower half of the body including feet of the occupant RD seated on the seat 10.

In addition, as shown in FIG. 18 and FIG. 19, a part of the flow of air W2 flowing below the front cover 50 is discharged rearwardly also from the right and left air discharge ports 651, 651 formed in the lateral center of the leg shield 601. In this case, as shown in FIG. 18, the part of the flow of air W2 is passed through the clearance KL between the bottom wall of the left goods storage portion 132 and the bottom covering portion 602A2 of the upper leg shield 602, and discharged from the left air discharge port 651. Also, as shown in FIG. 19, the part of the flow of air W2 is passed through the clearance KR between the shielding wall 716 projecting forward from the right goods storage portion 132 and the bottom covering portion 602A2 of the upper leg shield 602, and discharged from the right air discharge port 651.

Since the air discharge ports 651, 651 are formed in the bottom covering portions 602A2 for covering the lower sides of the goods storage portions 132, 133 composing the front storage box (storage portion) 131, the flow of air is introduced to the rear side and the lateral center portion of the leg shield 601. Thus, a suppression of the vacuum state in the foot space for the occupant RD is achieved.

In this structure, since the center tunnel portion 250 for connecting the leg shield 601 and the lower side of the seat is provided inside of the right and left air discharge ports 651, 651 in the vehicle width direction, the flow of air discharged from the air discharge ports 651, 651 is smoothly guided rearwardly along the lower inner covers 54, 54 or the like composing the right and left sidewalls of the center tunnel portion 250.

Thus, the center tunnel portion 250 functions as the discharged air guide portion for guiding the flow of air discharged from the right and left air discharge ports 651, 651 to the rear side, and an area for reducing the vacuum is enlarged rearward.

In addition, since the center tunnel portion 250 is configured such that the wall surface of the straddling portion (composed of the upper inner cover 53 and the lower inner covers 54, 54) located adjacently to the right and left air discharge ports 651, 651 is inclined to be closer to the center side in the vehicle width direction toward the rear side, the suppression of the vacuum state in the lateral center is effectively achieved.

Further, since the right and left air discharge ports 651, 651 are provided on the front upper side of the center tunnel portion 250, the flow of air discharged from the air discharge ports 651, 651 is led to flow not only to both the right and left sides of the center tunnel portion 250 but also to the upper side thereof. Thus, the area for reducing the vacuum in the lateral center is enlarged in the vertical direction.

As described above, according to the embodiment, since the air discharge ports 651, 651 for releasing the flow of air from the front side of the vehicle body to the rear side of the leg shield 601 are formed in the bottom covering portions 602A2 for covering the front storage box (storage portion) 131 from below, the flow of air is introduced to the rear side and the lateral center of the leg shield 601. Thus, the vacuum in the lateral center is reduced, and the windshield effect on the occupant is enhanced.

Moreover, since the foremost cover 130 composing the front cowl is provided forward of the leg shield 601, the open portion 187 for arranging the front wheel 2 is formed in the front surface of the front cowl, and the air discharge ports 651, 651 are arranged above the open portion 187 and directed downwardly and rearwardly, the dust, rainwater or the like entering together with the flow of air is less likely to be discharged from the air discharge ports 651, 651. In addition, the flow rate of the flow of air from the front side of the vehicle body is reduced. Further, the flow of air is introduced to the rear of the leg shield 601 with a moderate air volume.

In this structure, since the bottom wall 132C of the left goods storage portion 132 is arranged above the left air discharge port 651, the bottom wall 132C doubles as the shielding wall for blocking dust, rainwater or the like. Thus, the discharge of dust, rainwater or the like from the air discharge port 651 is suppressed, and the intrusion of dust, rainwater or the like from the air discharge port 651 into the foremost cover 130 is suppressed.

Further, in the structure, since the pair of left and right vertical ribs 130A, 130B extending in the longitudinal direction on the right and left sides of the air discharge port 651 is provided to the bottom covering portions 602A2, the vertical ribs 130A, 130B function as the guide members for discharging dust, rainwater or the like to the outside along the inclination of the bottom covering portions 602A2 (the inclination of the foremost cover 130) while avoiding an inflow of dust, rainwater or the like into the air discharge port 651. Thus, the discharge of dust, rainwater or the like from the air discharge port 651 is further suppressed, and the intrusion thereof from the air discharge port 651 into the foremost cover 130 is further suppressed.

Since the center tunnel portion 250 is provided for connecting the leg shield 601 and the lower side of the seat 10, and the air discharge ports 651, 651 are respectively provided on both the right and left sides of the center tunnel portion 250. Thus, the flow of air is guided rearwardly of the leg shield 601 by using the shape of the center tunnel portion 250, and the vacuum is effectively reduced.

Furthermore, since the center tunnel portion 250 is configured such that the wall surface of the straddling portion (composed of the upper inner cover 53 and the lower inner covers 54, 54) 250A located adjacently to the air discharge ports 651, 651 is inclined to be closer to the lateral center side toward the rear side, the air from the air discharge ports 651, 651 is guided to the lateral center by using the shape of the straddling portion 250A of the center tunnel portion 250, and the vacuum is effectively reduced.

Also, in the structure, since the bottom wall 132C of the left goods storage portion 132 is formed in the bent shape forming the labyrinth passage (clearance KL) for the flow of air directed to the left air discharge port 651, between the bottom wall and the bottom covering portion 602A2 for covering the lower side of the goods storage portion 132, the discharge of dust, rainwater or the like from the air discharge port 651 is further suppressed.

In addition, since the shielding wall 716 projecting forward from the right goods storage portion 133 is provided, and the shielding wall 716 is arranged offset on the center side in the vehicle width direction with respect to the right air discharge port 651, even if the goods storage portion 133 is compact, the shielding wall 716 effectively shields dust, rainwater or the like with respect to the flow of air introduced from the center of the vehicle, and the discharge of dust, rainwater or the like from the air discharge port 651 is further suppressed without enlarging the shielding wall 716.

Since the rib walls 655, 655 extend from the inner front edges of the air discharge ports 651, 651, the discharge of dust, rainwater or the like from the air discharge ports 651, 651 is further suppressed by the rib walls 655, 655.

Further, in the embodiment, since the air discharge ports 641, 641 for releasing the flow of air from the front side of the vehicle body to the rear side are provided in the side ends of the leg shield 601, and also the lateral covering portions 602A1, 602A1 (FIG. 14, FIG. 15) are provided which function as the discharged air guide portions extending rearwardly inside the vehicle width direction of the air discharge ports 641, 641, the area for preventing the entrainment of the flow of air is enlarged rearwardly. Thus, the windshield effect behind the leg shield 601 is further enhanced.

Further, since the front storage box (storage case) 131 is provided inside the vehicle width direction of the air discharge ports 641, 641, the front storage box 131 bulges rearwardly of the air discharge ports 641, 641, and the vehicle body cover C covering the outside of the front storage box 131 composes the discharged air guide portions (lateral covering portions 602A1, 602A1), the vehicle body cover C covering the outside of the front storage box 131 doubles as the discharged air guide portion, and the discharged air guide portion is provided without increasing the number of components.

Since the front storage box 131 bulges forward of the air discharge ports 641, 641, and the air guide passage K2 (FIG. 16) for guiding the flow of air to the air discharge ports 641, 641 is formed by the sidewall of the front storage box 131 and the vehicle body cover C, the air guide passage is easily formed by using the clearance opened between the front storage box 131 and the vehicle body cover C.

Further, in the structure, as shown in the above-mentioned FIG. 14 and FIG. 15, since the leg shield 601 has a V-shaped form vertically enlarged toward the rear in the side view of the vehicle body, the air discharge ports 641, 641 are formed in the upper side portions 602A extending upwardly to the rear, of the leg shield 601, and the rear sides of the air discharge ports 641, 641 are formed as the space directed downwardly, the flow of air discharged from the air discharge ports 641, 641 is led to flow rearwardly extensively to the rear and downward sides, and the windshield effect is vertically enhanced.

Also, in this structure, since the fastening portions BT, BT (FIG. 17) for fastening the leg shield 601 and the front cover 50 as the vehicle body cover C on the front side of the leg shield 601 are provided to the air discharge ports 641, 641, the fastening portions BT, BT are unnoticeably arranged and are less likely to be viewed from the occupant RD.

Also, as shown in the above-mentioned FIG. 14 and FIG. 15, since the head light 62 and the lamp units 62U, 63U for the blinkers 63 are provided forward of the leg shield 601, and the rear surfaces of the lamp units 62U, 63U are formed into a shape directed upwardly as they are directed to the rear side, the flow of air W2 from the front side of the vehicle body (FIG. 6, FIG. 7) is easily led to flow to the rear sides of the lamp units 62U, 63U, and the flow of air is smoothly led to flow to the air discharge ports 641, 641 positioned behind the lamp units 62U, 63U.

Also, since the vertical fins 643, 643 (FIG. 6) are provided to the air discharge ports 641, 641, the flow of air W2 (FIG. 14, FIG. 15) passed through the air discharge ports 641, 641 is straightened in the optional direction in the vehicle width direction, and also the openings of the air discharge ports 641, 641 are less likely to be viewed from the right and left sides of the motorcycle 1.

In the above-described embodiment, one aspect of the present invention has been merely described, and the various design modification and application may be optionally made within the scope not departing from the gist of the prevent invention.

For example, in the above-mentioned embodiment, the case that the pair of right and left air discharge ports 651, 651 is provided has been described. However, the number or position thereof may be appropriately changed within a range such that the flow of air can be introduced to the rear and the lateral center of the leg shield 601. Also, in the above-mentioned embodiment, the case wherein the vertical fins 653 are provided to the air discharge ports 651, 651 has been described. However, a known shape for the vertical fins or the like provided to the air discharge ports may be applied.

Also, in the above-mentioned embodiment, the case that the air discharge ports 641, 641 are formed also in the side ends of the leg shield 601 has been described. However, the air discharge ports 641, 641 may be omitted. Also, the case wherein the air discharge ports 641, 641 are formed in the side ends of the upper side portions 602A, 602A of the upper leg shield 602 has been described. However, this is not limited thereto, and the air discharge ports 641, 641 may be formed in the side ends of the lower side portions 602B, 602B. Also, the number of the air discharge ports 641, 641 is not limited to one with respect to each of the right and left sides. In addition, a plurality of air discharge ports 641, 641 may be provided.

Also, in the above-mentioned embodiment, the case that the air discharge ports 641, 641 are integrally provided to the upper inner cover 53 has been described. However, the air discharge ports 641, 641 may be provided integrally to the front cover 50. In this case, for example, a plurality of openings are formed at intervals in the vertical direction in the rear walls 50B, 50B of the front cover 50, and portions sandwiched between the openings are formed as the lateral fins 644. With this structure, since the air discharge ports 641, 641 are provided by using the front cover 50, and also the portions sandwiched between the openings of the front cover 50 are formed as the lateral fins 644, an air direction is set in the optional direction.

Further, the present invention is not limited to the application with respect to the motorcycle 1 but is applicable to saddle-ride type vehicles including vehicles other than the motorcycles. Note that the saddle-ride type vehicles are vehicles which include all types of the vehicles configured such that the rider strides and rides on the vehicle body, and which include not only the motorcycles (including motorized bicycles) but also three- and four-wheeled vehicles classified into ATVs (All Terrain Vehicles).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A windshield structure for a saddle-ride vehicle comprising:
    a leg shield provided forward of a seat on which an occupant is seated;
    a storage portion openably and closably provided in a surface of the leg shield on a side of the seat; and
    a lower wall formed integrally with the leg shield and formed to cover the storage portion from below;
    wherein the lower wall is formed with an air discharge port with a rib wall extending from an inner front edge of the air discharge port, said air discharge port releasing a flow of air from a front side of a vehicle body to a rear side of the leg shield.

2. The windshield structure for a saddle-ride vehicle according to claim 1, wherein a bottom wall of the storage portion forms a labyrinth passage for the flow of air directed to the air discharge port between the lower wall and the bottom wall.

3. The windshield structure for a saddle-ride vehicle according to claim 1, wherein the storage portion includes a shielding wall extending forward from the storage portion; and
    the shielding wall is offset on the center side in the vehicle width direction with respect to the air discharge port.

4. The windshield structure for a saddle-ride vehicle according to claim 1, wherein a front cowl is provided forward of the leg shield, said front cowl including a front surface formed with an open portion for arranging a front wheel;
    the air discharge port is arranged above the open portion and directed downwardly and rearwardly;
    the storage portion is formed to bulge forward in the leg shield; and
    a wall surface composing the storage portion is arranged above the air discharge port.

5. The windshield structure for a saddle-ride vehicle according to claim 4, further comprising a center tunnel portion connecting the leg shield and a lower portion of the seat;
    wherein the air discharge port is provided in each of both right and left sides of the center tunnel portion.

6. The windshield structure for a saddle-ride vehicle according to claim 4, wherein the wall surface is a bottom wall of the storage portion and forms a labyrinth passage for the flow of air directed to the air discharge port between the lower wall and the bottom wall.

7. The windshield structure for a saddle-ride vehicle according to claim 4, wherein the storage portion includes a shielding wall extending forward from the storage portion; and
    the shielding wall is offset on the center side in the vehicle width direction with respect to the air discharge port.

8. The windshield structure for a saddle-ride vehicle according to claim 1, further comprising a center tunnel portion connecting the leg shield and a lower portion of the seat;
    wherein the air discharge port is provided in each of both right and left sides of the center tunnel portion.

9. The windshield structure for a saddle-ride vehicle according to claim 8, wherein a bottom wall of the storage portion forms a labyrinth passage for the flow of air directed to the air discharge port between the lower wall and the bottom wall.

10. The windshield structure for a saddle-ride vehicle according to claim 8, wherein the storage portion includes a shielding wall extending forward from the storage portion; and
    the shielding wall is offset on the center side in the vehicle width direction with respect to the air discharge port.

11. The windshield structure for a saddle-ride vehicle according to claim 8, wherein the center tunnel portion is configured wherein wall surfaces located adjacent to the air discharge port are inclined toward a center side in a vehicle width direction toward a rear side.

12. The windshield structure for a saddle-ride vehicle according to claim 11, wherein a bottom wall of the storage portion forms a labyrinth passage for the flow of air directed to the air discharge port between the lower wall and the bottom wall.

13. The windshield structure for a saddle-ride vehicle according to claim 11, wherein the storage portion includes a shielding wall extending forward from the storage portion; and
    the shielding wall is offset on the center side in the vehicle width direction with respect to the air discharge port.

14. A windshield structure for a saddle-ride vehicle comprising:
    a leg shield;
    a storage portion provided in a surface of the leg shield;
    a closure for the storage portion being movable from a closed to an open position for covering the storage portion from above; and a lower wall formed integrally with the leg shield for covering the storage portion from below;

wherein the lower wall is formed with an air discharge port with a rib wall extending from an inner front edge of the air discharge port, said air discharge port releasing a flow of air from a front side of a vehicle body to a rear side of the leg shield.

15. The windshield structure for a saddle-ride vehicle according to claim 14, wherein a front cowl is provided forward of the leg shield, said front cowl including a front surface formed with an open portion;

the air discharge port is arranged above the open portion and directed downwardly and rearwardly;

the storage portion is formed to bulge forward in the leg shield; and a wall surface composing the storage portion is arranged above the air discharge port.

16. The windshield structure for a saddle-ride vehicle according to claim 14, further comprising a center tunnel portion connecting the leg shield and a lower portion of a seat;

wherein the air discharge port is provided in each of both right and left sides of the center tunnel portion.

17. The windshield structure for a saddle-ride vehicle according to claim 16, wherein the center tunnel portion is configured wherein wall surfaces located adjacent to the air discharge port are inclined toward a center side in a vehicle width direction toward a rear side.

* * * * *